(12) United States Patent
Ito et al.

(10) Patent No.: US 6,607,681 B1
(45) Date of Patent: Aug. 19, 2003

(54) MOLDED PRODUCT HAVING A COATING FILM AND PROCESS FOR FORMING COATING FILM

(75) Inventors: Takayuki Ito, Aichi-ken (JP); Toshihiko Asaya, Nagoya (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 0 days.

(21) Appl. No.: 09/522,045

(22) Filed: Mar. 9, 2000

(30) Foreign Application Priority Data

| Sep. 29, 1999 | (JP) | ......................... | 11-276183 |
| Sep. 29, 1999 | (JP) | ......................... | 11-276184 |
| Sep. 29, 1999 | (JP) | ......................... | 11-276185 |
| Sep. 29, 1999 | (JP) | ......................... | 11-276188 |
| Sep. 29, 1999 | (JP) | ......................... | 11-276189 |
| Sep. 29, 1999 | (JP) | ......................... | 11-276190 |
| Sep. 29, 1999 | (JP) | ......................... | 11-276193 |
| Oct. 4, 1999 | (JP) | ......................... | 11-283077 |

(51) Int. Cl.$^7$ .......................... B05D 3/00; B29C 44/06; B29C 44/12
(52) U.S. Cl. ................. 264/46.4; 264/46.6; 264/46.7; 264/102; 264/255; 427/294
(58) Field of Search ................. 264/255, 101, 264/102, 46.4, 46.7, 46.6; 427/294

(56) References Cited

U.S. PATENT DOCUMENTS

| 3,576,930 A | * | 4/1971 | Watters et al. ............. 264/45.2 |
| 4,389,454 A | * | 6/1983 | Horacek et al. ............. 264/255 |
| 4,455,340 A | * | 6/1984 | Okina ........................ 264/46.6 |
| 4,637,904 A | * | 1/1987 | Rounds ........................ 264/1.4 |
| 5,633,289 A | | 5/1997 | Nakamura et al. |
| 5,962,142 A | * | 10/1999 | Tachi et al. ................. 264/255 |
| 6,036,900 A | * | 3/2000 | Munk et al. ................. 264/102 |

FOREIGN PATENT DOCUMENTS

| DE | 34 07 474 | 8/1985 |
| DE | 195 21 315 | 12/1996 |
| EP | 0534358 | 3/1993 |
| EP | 0 771 642 | 5/1997 |
| EP | 0781643 A2 | 7/1997 |
| EP | 7119022 | 5/1999 |
| EP | 1 040 906 A1 | 10/2000 |
| JP | 5057735 | 3/1993 |
| JP | 09094925 | 4/1997 |
| JP | 09094926 | 4/1997 |
| JP | 9183138 | 7/1997 |
| JP | 10000652 | 1/1998 |
| JP | 10000653 | 1/1998 |
| JP | 10000654 | 1/1998 |
| WO | WO 96/03264 | 2/1996 |
| WO | WO 96/41715 | 12/1996 |

OTHER PUBLICATIONS

Patent Abstracts of Japan, vol. 1998, No. 05, Apr. 30, 1998 & JP 10 000652 A (Toyoda Gosei Co Ltd), Jan. 6, 1998.
Patent Abstracts of Japan, vol. 1998, No. 05, Apr. 30, 1998, & JP 10 000653 A (Toyoda Gosei Co Ltd), Jan. 6, 1998.
Patent Abstracts of Japan, vol. 011, No. 082, (M–571), Mar. 12, 1987 & JP 61 237611 A (Toyota Motor Corp), Oct. 22, 1986.
Patent Abstracts of Japan, vol. 012, No. 381, (M–752), Oct. 12, 1988 & JP 63 134209 A (Nippon Plast Co Ltd), Jun. 6, 1988.
Patent Abstracts of Japan, vol. 1998, No. 02, Jan. 30, 1998 & JP 09 277304 A (Nippon Plast Co Ltd), Oct. 28, 1997.
Patent Abstracts of Japan, vol. 017, No. 382 (C–1085), Jul. 19, 1993 & JP 05 065694 A (Isuzu Motors Ltd), Mar. 19, 1993.
Database WPI, Section Ch, Week 199252 Derwent Publications Ltd., London, GB; Class A32, AN 1992–430659 XP002138203 & JP 04 329112 A (Isuzu Motors Ltd), Nov. 17, 1992.

* cited by examiner

*Primary Examiner*—Allan R. Kuhns
(74) *Attorney, Agent, or Firm*—Posz & Bethards, PLC

(57) ABSTRACT

A process for forming a coating layer on the surface of a molded product by boiling a coating solution in a closed metal mold. The molding process includes depressurizing the cavity of the metal mold, boiling a coating solution in the cavity and injecting a urethane material into the cavity under reduced pressure.

25 Claims, 15 Drawing Sheets

MOLDED PRODUCT HAVING A COATING FILM AND PROCESS FOR FORMING COATING FILM

BACKGROUND OF THE INVENTION

The present invention relates to a molded product and a process for manufacturing a molded product.

Typically, vehicle steering wheels are manufactured by resin molding. A core bar is first set in a metal mold at a predetermined position. Thereafter, a resin material is injected into the cavity of the metal mold and cured. A urethane resin is used as the resin material. A coating film having light resistance is formed on the surface of the resin molded part to prevent discoloration of the urethane resin by exposure to light.

A method of forming the coating film includes applying a coating to the inner wall of the metal mold (the surface of the cavity) prior to molding. More specifically, a coating solution is sprayed on the inner wall of the opened metal mold with a spray gun. The metal mold is closed and a filler material (urethane material) is injected into the mold cavity and cured. Thus, a molded product having a coating film on the surface is produced. A molding method in which a predetermined material is injected into the cavity and cured by a chemical reaction is called "reaction injection molding" (RIM).

However, when a coating solution is applied with a spray gun, the coating may be applied to parts other than the surface of the cavity or may scatter into the air without adhering to the surface of the cavity. Therefore, the adhesion efficiency of the coating is low. Since the coating applied to surfaces other than the surface of the cavity produces a burr after molding, the step of removing this burr is required. Further, the material that scatters into the air stains the work site.

On the other hand, when a coating solution is directly applied to a molded product with a spray gun, it is difficult to apply the coating uniformly. It is particularly difficult to properly apply the coating to the parting line of a molded product. Therefore, the light resistance of the steering wheel may not be complete.

SUMMARY OF THE INVENTION

It is an object of the present invention to provide a molded product having excellent light resistance and a manufacturing process for the same.

To achieve the above objective, the present invention provides a process for manufacturing a molded product having a coating layer on the surface. The process includes forming a coating layer on the wall surface of a cavity while a metal mold is closed, and filling a filler material in the cavity.

Another aspect of the present invention provides a molded product formed by injecting a filler material into the cavity of a metal mold, wherein the filler material is coated with a film having a substantially uniform thickness.

Further aspects of the present invention provide a steering wheel having a first side facing a driver and a second side, which is opposite to the first side. The steering wheel is coated with a film. The film is thicker on the first side than on the second side.

Further aspects of the present invention provide a process for molding a steering wheel providing a metal mold having a mold cavity. The cavity is formed such that a grip portion of the steering wheel faces downward. The process includes boiling a coating solution, during which a coating layer is formed on the wall surface of the cavity from the coating solution, and supplying a predetermined filler material into the cavity.

Further aspects of the present invention provide a process for manufacturing an insert molded product. The process includes setting an insert member in a metal mold, forming a coating layer on the wall surface of a cavity in the metal mold while the metal mold is closed, and depositing a filler material into the cavity.

Further aspects of the present invention provide an insert molded product formed by molding a filler material. The product includes an insert member, an intermediate layer formed from the same material as the coating film and located between the insert member and the filler material, and a coating film formed on the surface of the filler material, the coating film having substantially uniform thickness.

Further aspects of the present invention provide a method of coating a coating on the wall surface of a cavity in a metal mold. The method includes closing the metal mold, supplying a solution of the coating into the cavity, and depressurizing the cavity.

Further aspects of the present invention provide a method of coating a coating on the wall surface of a cavity in a metal mold. The method includes closing the metal mold, depressurizing the cavity, and supplying a coating solution into the cavity during the depressurizing step.

Further aspects of the present invention provide a molded product of a urethane resin formed by foam molding using water. The molded product includes a core portion molded by foaming a urethane material, and a coating film having a substantially uniform thickness, the film being formed on the surface of the core portion, wherein the surface characteristics of the metal mold is transferred to the coating.

Further aspects of the present invention provide a process for manufacturing a urethane resin molded product formed by foam molding using water. The process includes boiling a coating solution in a cavity in a metal mold while the metal mold is closed, during which time a coating film is formed on the wall surface of the cavity from the coating solution, and supplying a urethane material into the cavity at normal pressure.

Further aspects of the present invention provide a product molded with urethane material in a mold cavity. The product includes a core portion made of a highly foamed urethane material, a skin layer formed on the outside of the core portion, the skin layer being made of a urethane material that has less foaming than the core portion, and a coating film formed with a substantially uniform thickness on the surface of the skin layer, wherein the surface characteristics of the cavity are transferred to the film.

Further aspects of the present invention provide a process for manufacturing a foamed urethane molded product having a surface skin layer. The process includes depressurizing a cavity in a metal mold, boiling a coating solution in the cavity, forming a coating layer on the wall surface of the cavity during the boiling step, and injecting a urethane material into the cavity under reduced pressure.

Further aspects of the present invention provide a process for manufacturing a resin molded product, wherein molding and coating are performed simultaneously. The process includes applying a coating solution to the wall surface of a cavity in a metal mold, boiling the coating solution in the cavity under reduced pressure to form a coating layer on the wall surface of the cavity, heating a resin material to reduce flow resistance, supplying the heated resin material into the cavity, and curing the resin material in the cavity.

Further aspects of the present invention provide a product molded with resin material. The flow resistance of the resin material can be reduced by heating. The resin material is coated with a film having a substantially uniform thickness.

Further aspects of the present invention provide a process for manufacturing a urethane molded product. The process includes forming a coating layer on the surface of a cavity of a closed metal mold, first injecting a first urethane material containing a pigment into the cavity, and second injecting a second urethane material that includes a larger amount of pigment than the first urethane material.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
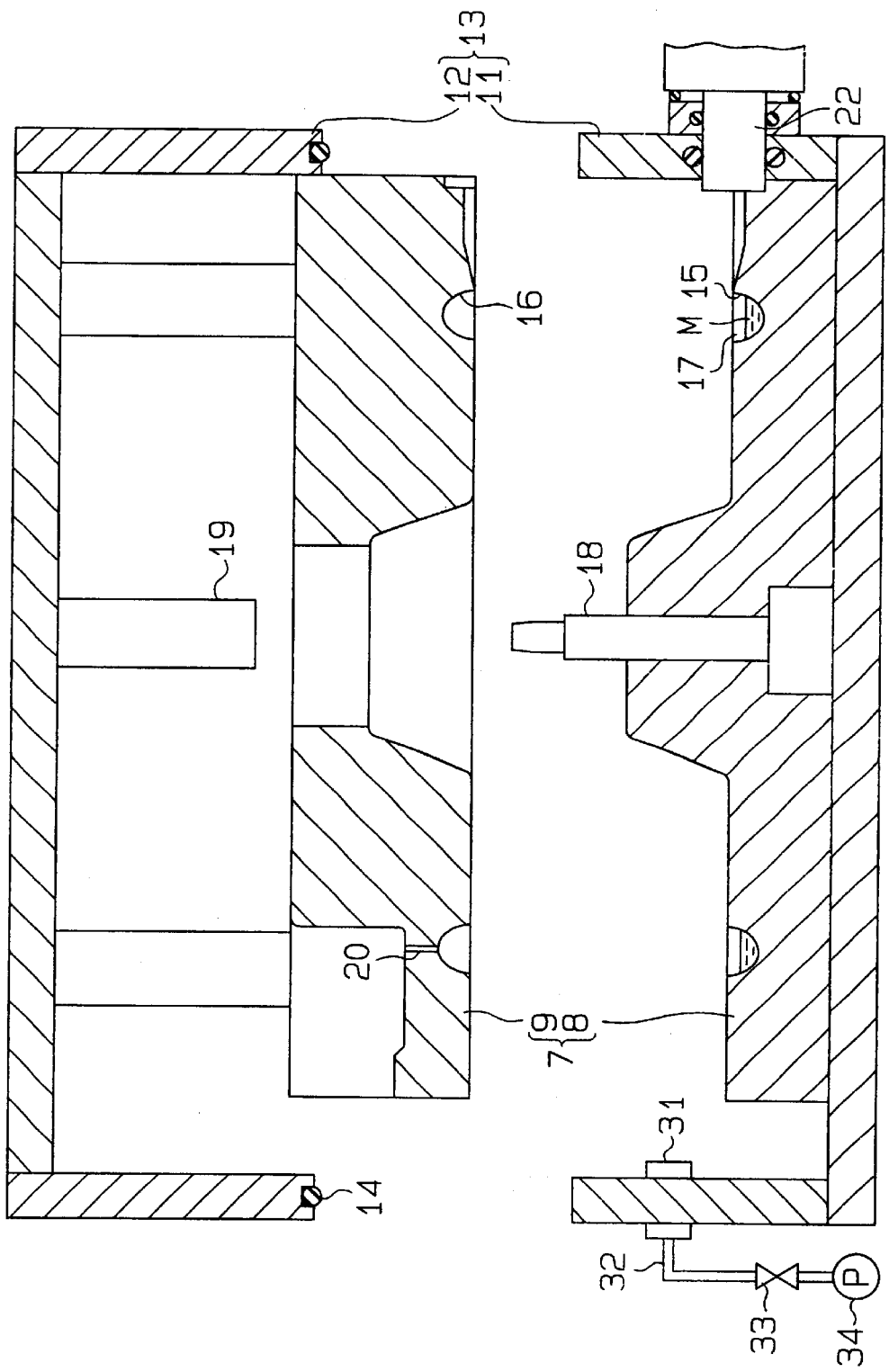
FIG. 1, FIG. 2 and FIG. 3 are diagrams illustrating a process for molding a steering wheel according to a first embodiment of the present invention.

In the drawings, like numerals are used for like elements throughout.

First Embodiment

The first embodiment of the present invention will be described below with reference to the accompanying drawings.

Figure 3:
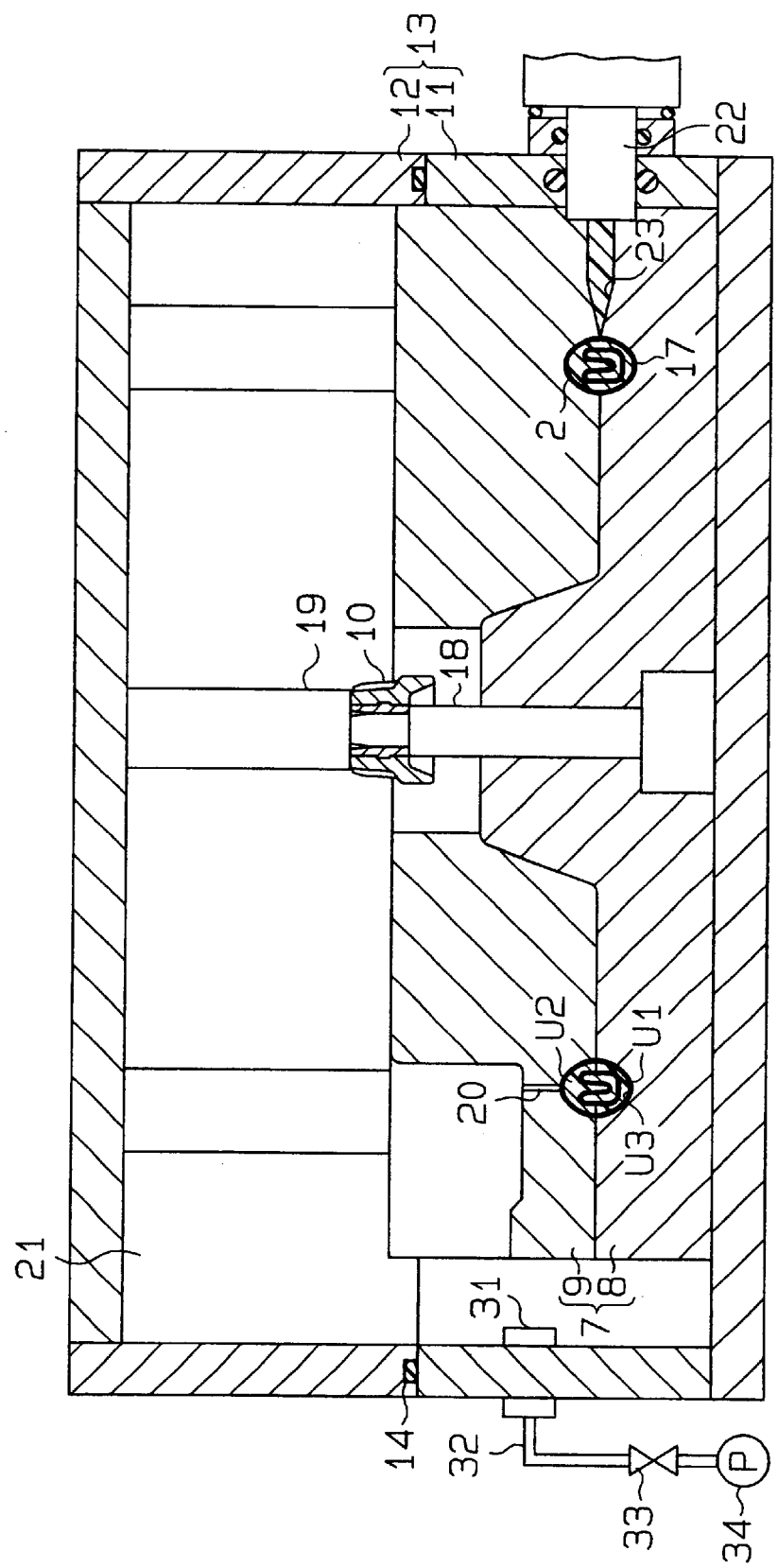
Figure 4:
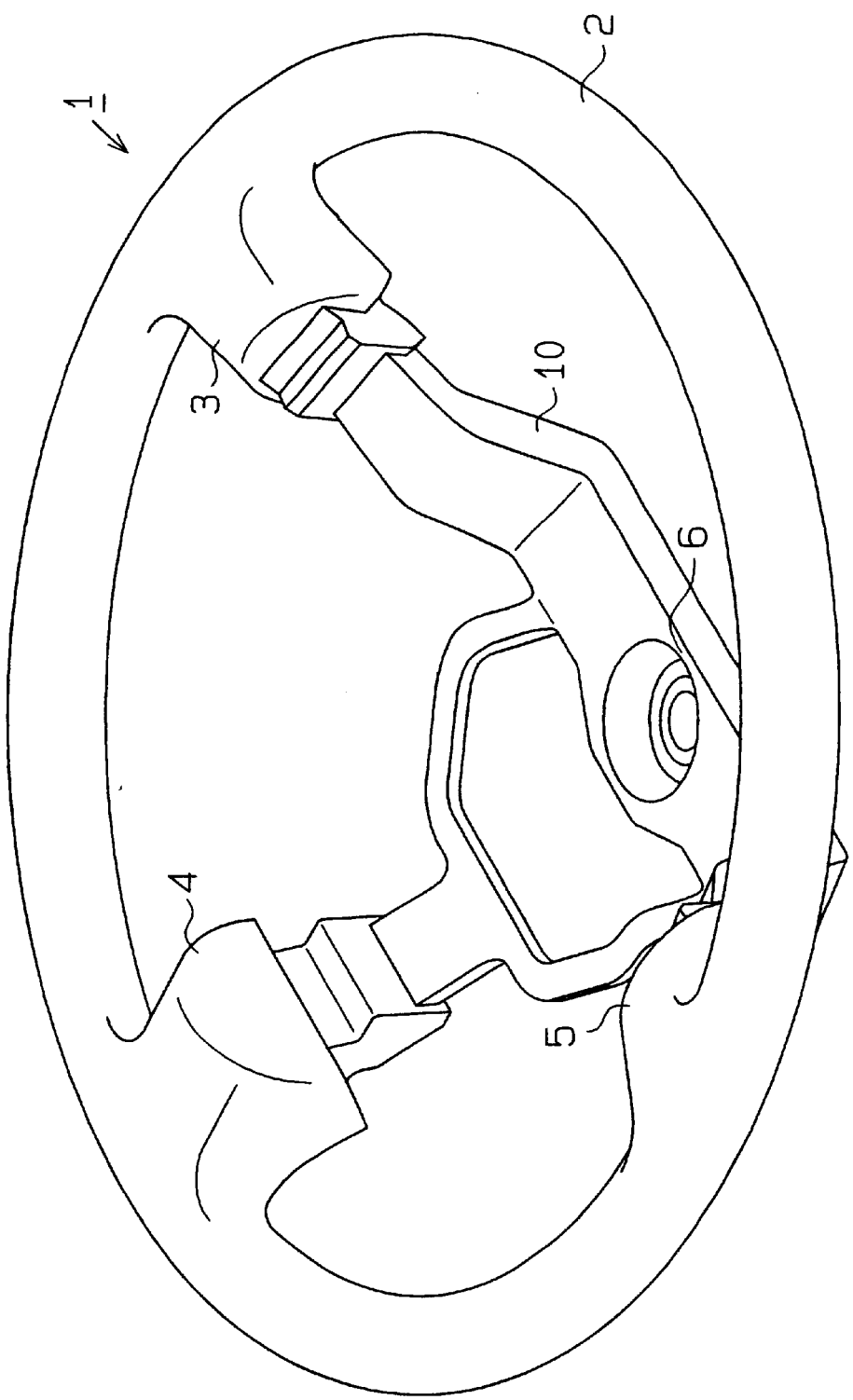
FIG. 4 is a perspective view of the steering wheel of the first embodiment.

As shown in FIG. 4, a steering wheel 1 has an annular grip portion 2, three spoke portions 3, 4 and 5, and a boss plate 6. The grip portion 2 and the spoke portions 3, 4 and 5 are covered with a urethane resin. The urethane resin portions are formed by reaction injection molding. In the reaction injection molding step, the grip portion 2 is set in a metal mold 7 (lower die 8 and upper die 9) shown in FIGS. 1 to 3 such that the surface of the steering wheel that faces the driver faces downward in the mold.

The metal mold 7 includes a lower die 8 fixed to a frame 11 and an upper die 9 fixed to a cover 12. The frame 11 and the cover 12 form a box 13. Therefore, the metal mold 7 is placed in the inside of the box 13. A sealing member 14 is provided in the mating surface of the cover 12, which faces the frame 11. The metal mold 7 is moved between an open state shown in FIG. 1 and a closed state shown in FIG. 2. When the metal mold 7 is closed, the inside of the box 13 is sealed by the sealing member 14.

Figure 2:
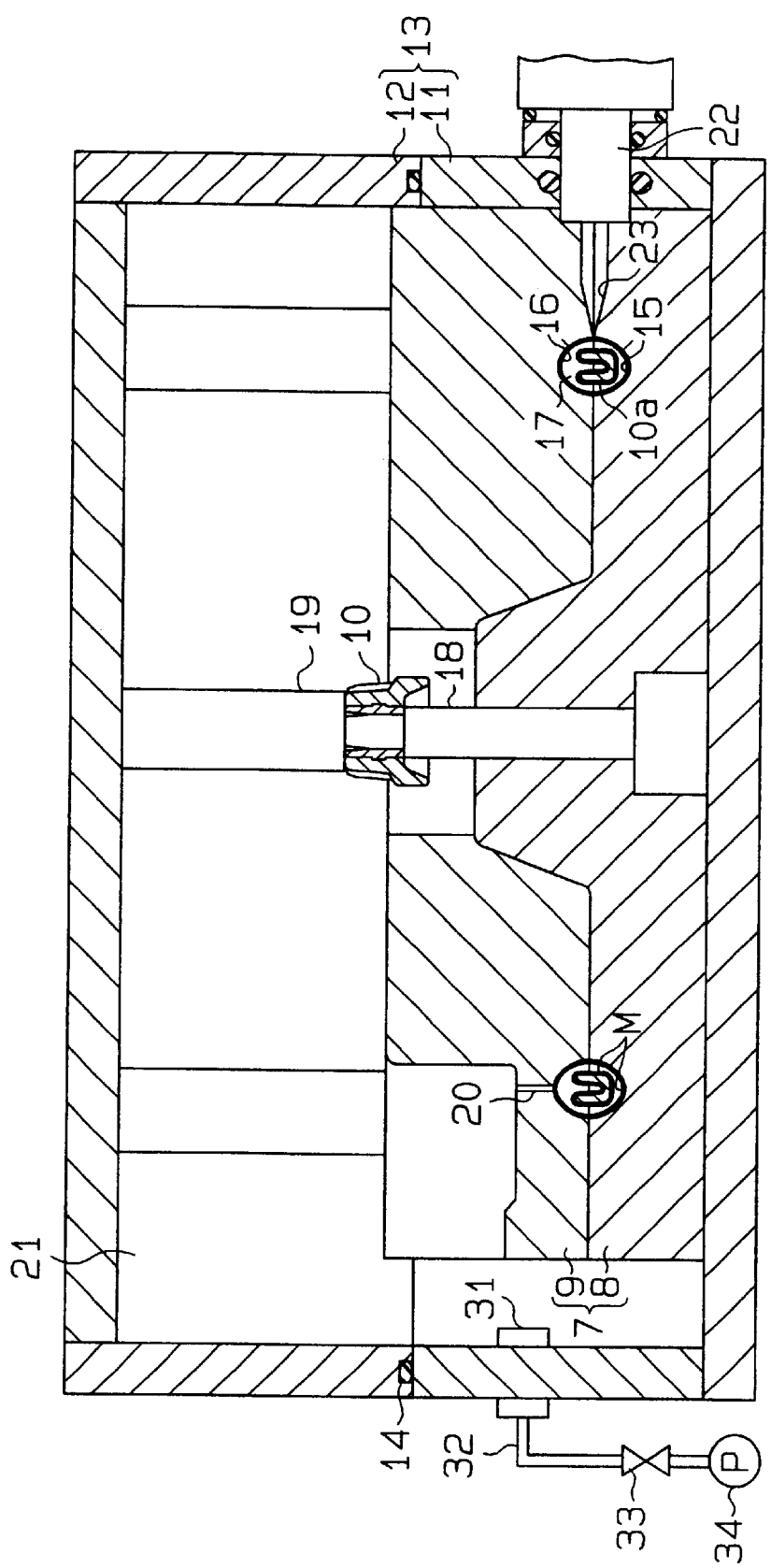

During molding, the frame 11 and the lower die 8 are moved to a closing position and clamped. A core bar 10 is manufactured by die casting aluminum, magnesium or alloy thereof. As shown in FIG. 2, a grip core bar 10a has a U-shaped cross section.

A lower recess portion 15 and an upper recess portion 16 are formed in the lower die 8 and the upper die 9, respectively. When the metal mold 7 is closed, a cavity 17 is defined by both recess portions 15 and 16. An exhaust hole 20 (having, for example, a cross section of 4 mm$^2$) is formed in the upper die 9. The exhaust hole 20 communicates with the upper recess portion 16 and a hollow portion 21. A lower fixing member 18 is placed at the center portion of the lower die 8. The lower fixing member 18 extends in an upward direction. An upper fixing member 19 is placed at the center portion of the cover 12. The upper fixing member 19 extends in a downward direction. As shown in FIG. 2, the core bar 10 is fixed by the lower fixing member 18 and the upper fixing member 19 during molding.

An injection nozzle 22 is formed in the side wall of the frame 11. A liquid urethane resin material is mixed by an unillustrated urethane injector and injected into the metal mold 7 from the injection nozzle 22. A urethane material is supplied to the cavity 17 through a gate 23. The urethane material contains a polyol component and an isocyanate component.

An exhaust pipe 31 is installed in the side wall of the frame 11 at a position opposite to the injection nozzle 22. The exhaust pipe 31 is connected to a vacuum pump 34 by a pipe 32 and a valve 33. The vacuum pump 34 reduces the pressure in the box 13.

A process for molding the steering wheel 1 according to the first embodiment will be described below with reference to FIGS. 1 to 3.

To facilitate the removal of molded products, a parting agent is applied to the wall of the cavity 17 of the metal mold 7 when the mold 7 is opened. The parting agent prevents the molded product from sticking to the metal mold 7. The parting agent contains wax or silicone oil.

Thereafter, the metal mold 7 is kept horizontal so that the grip portion 2 is positioned on a horizontal plane and a liquid coating M (150 gram in the first embodiment) is injected into the lower recess portion 15. The coating M contains methyl ethyl ketone (MEK) and isopropyl alcohol (IPA), which are solvents, and a urethane resin, which is a solid filler. MEK, IPA and the urethane resin are contained in the coating M in amounts of about 85 wt %, about 10 wt % and about 2.5 wt %, respectively. As shown in FIG. 2, the core bar 10 is set in the metal mold 7, and the mold is closed.

Next, the pressure in the box 13 is reduced by the vacuum pump 34. When the pressure in the cavity 17 is reduced, the boiling points of the solvents (MEK, IPA) contained in the coating M fall. When the pressure reaches a predetermined level, the coating M boils. More specifically, the temperature of the metal mold 7 is maintained at 55° C. When the pressure in the cavity 17 is reduced to 300 Torr or less, the MEK and IPA boil. During the boiling of the MEK and IPA, the coating M foams and its volume expands. The coating M adheres to the wall surface of the cavity 17 by the breakage of the foam. Thereafter, the solvents of the coating M evaporate, and a coating layer of the urethane resin is formed on the wall surface of the cavity 17. The solvents clean the surface of the core bar 10 in the cavity 17. The coating M, which also functions as an adhesive, adheres to the surface of the core bar 10. The solvents evaporate in about 60 seconds and the evaporated solvents are exhausted to the outside of the metal mold 7 through the exhaust hole 20, the hollow portion 21 and the exhaust pipe 31.

Subsequently, as shown in FIG. 3, the liquid urethane material, which has been mixed by the unillustrated urethane injector, is injected into the cavity 17 from the injection nozzle 22 through the gate 23 while a predetermined reduced pressure is maintained. The polyol component reacts with the isocyanate component, and the urethane resin foams and cures.

Figure 5:
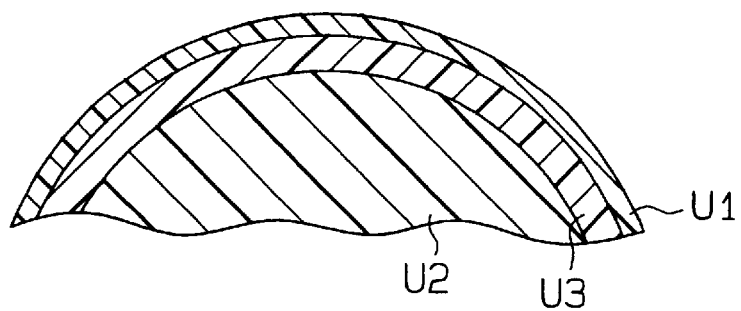
FIG. 5 is a sectional view of the grip portion of the steering wheel of FIG. 4.

FIG. 5 is an enlarged sectional view of the grip portion 2. Since the steering wheel 1 is foam molded by injecting the urethane material into the cavity 17 under reduced pressure, it has a highly foamed core portion U2 and a slightly foamed skin layer U3 (refer to Japanese Patent No. 2518481). This skin layer U3 provides not only a soft feel but also a solid feel to the steering wheel 1. A urethane resin coating layer U1 having light resistance is formed on the surface of the skin layer U3 with a substantially uniform thickness (for example, 10 μm).

Foam molding using the liquid urethane material is carried out at a lower temperature and a lower pressure in the cavity 17 than the injection molding of a general thermoplastic resin. Therefore, the coating layer formed on the wall surface of the cavity 17 is prevented from being destroyed by pressure and temperature during molding. Further, since the urethane material is injected into the cavity 17 under reduced pressure, the likelihood of a failure to fill the cavity 17 with the material is reduced.

After completion of the molding, the metal mold 7 is opened and the steering wheel 1 is taken out. Thus, the process of molding the steering wheel 1 having the grip portion 2 and the spoke portions 3, 4 and 5 covered with the urethane layers U1 and U2 is complete.

By molding with the grip portion 2 facing downward, the coating layer U1 on the front side of the steering wheel 1, which is required to have higher light resistance, has a greater thickness.

The thickness of the coating layer U1 on the resin surface of the steering wheel 1 was measured with a color difference meter. The result is shown in Table 1.

Table 1 shows the measurement results of the steering wheel of the first embodiment and a prior art product coated with the coating M by means of a spray gun. The urethane resins used for the core portion U2 and the coating layer U1 of the steering wheel 1 have the same color, but a coloring component was removed from the urethane resin of the core portion U2 to check the state of the coating layer U2 with a color difference meter. Table 1 shows the measurement results of a plurality of locations on the grip portion 2. The color of the uppermost portion (front side), where the coating film is thick, is used as a standard color, or reference. That is, when the color difference ΔE is zero, the thickness of the coating layer U1 at that position is the same as that of the uppermost portion. As the color difference ΔE increases, the thickness of the coating layer U1 at that position is less than that of the uppermost portion. The locations where measurements were taken are an intermediate position (upper intermediate portion) between the uppermost portion (front side) and the parting line portion (PL portion) of the grip portion 2, the PL portion, an intermediate position (lower intermediate portion) between the PL portion and the lowermost portion, and the lowermost portion (rear side).

TABLE 1

| Measurement position | Color difference | |
|---|---|---|
| | First embodiment | Prior art |
| Upper intermediate portion | ΔE = 0.62 | ΔE = 6.63 |
| PL portion | ΔE = 0.46 | ΔE = 17.89 |
| Lower intermediate portion | ΔE = 1.08 | ΔE = 7.91 |
| Lowermost portion | ΔE = 0.85 | ΔE = 2.80 |

As shown in Table 1, the prior art product has a large color difference ΔE at each position, particularly at the PL portion. The reason for this is that when the coating solution is applied with a spray gun, the thickness of the coating film is nonuniform. Particularly, the coating thickness at the PL portion, which has a surface substantially perpendicular to the split surface, is less than that of the uppermost portion. In contrast, the color difference ΔE is relatively small at each location, and the coating film has a substantially uniform thickness in the first embodiment. It is also seen that a coating film having almost the same thickness as that of the uppermost portion is formed at the PL portion.

Next, steering wheels molded by changing the amount of each component of the coating solution were evaluated based on dilutability, coatability and dryability of the coating solution. The results are shown in Table 2 together with the composition of each coating solution. The solid filler in Table 2 is a urethane resin for forming the coating layer. When aggregation of the solid filler did not occur at the time of dilution, the solid filler was marked with O to indicate that it had high dilutability (O represents positive results). On the other hand, when aggregation of the solid filler occurred at the time of dilution, the solid filler was marked with X to indicate that it had low dilutability (X represents poor results). When the coating solution dried in less than 60 seconds, it was marked with O to indicate that it had high dryability. When the coating solution dried in 60 seconds or more, it was marked with Δ to indicate that it had low dryability (Δ represents mixed results).

TABLE 2

| | Amount of each component (gram) | | | | Result | | | |
|---|---|---|---|---|---|---|---|---|
| No. | Solid filler | IPA | MEK | Toluene | Dilutability | Coatability | Dryability | Evaluation |
| 1 | 30 | 130 | 220 | 20 | O | O | Δ | Δ |
| 2 | 30 | 30 | 220 | 20 | X | — | — | X |
| 3 | 30 | 530 | 620 | 20 | O | O | Δ | Δ |
| 4 | 30 | 130 | 620 | 20 | O | O | O | O |
| 5 | 30 | 130 | 1020 | 20 | O | O | O | O |

TABLE 2-continued

| | Amount of each component (gram) | | | | Result | | | |
|---|---|---|---|---|---|---|---|---|
| No. | Solid filler | IPA | MEK | Toluene | Dilutability | Coatability | Dryability | Evaluation |
| 6 | 30 | 130 | 1420 | 20 | X | — | — | X |
| 7 | 30 | 130 | 1820 | 20 | X | — | — | X |

As shown in Table 2, coating solution No. 1 showed excellent dilutability and coatability but its drying time was long. Therefore, the symbol Δ was used to represent the evaluation. Coating solutions Nos. 2, 6 and 7, which contained a smaller amount of IPA than MEK, showed low dilutability. Therefore, the evaluation was represented with the symbol X. In coating solutions No. 1, No. 4 and No. 5, the amount of MEK was increased to a level such that the solid filler did not aggregate. As a result, the drying time of the coating solutions shortened. Therefore, the evaluation of the coating solutions No. 4 and No. 5 were represented by the symbol O. When the amounts of MEK and IPA were increased in coating solution No. 3, the drying time was extended. Therefore, evaluation of the coating solution No. 3 was represented by the symbol Δ. The coatability of each of the coating solutions Nos. 1, 3, 4 and 5, which had excellent dilutability, was satisfactory. However, it was difficult to apply coating solutions Nos. 2, 6 and 7, which had poor dilutability.

Thus, when MEK was added to dilute the coating such that aggregation did not occur, the dryability improved and coatability was maintained. Therefore, in the first embodiment, coating solution No. 5, which was prepared by adding MEK in an amount (800 g) 2 times larger than that (400 g) of coating solution No. 1 to dilute the coating was used as the resin material for the steering wheel 1.

When the coating M was applied with a spray gun as in the prior art, the adhesion efficiency to the inside of the cavity 17 was about 20%. In contrast to this, in the first embodiment, the adhesion efficiency to the inside of the cavity 17 was about 50 to 70%.

The first embodiment has the following advantages.
(1) Since the coating M is applied to the inside of the closed metal mold 7, the adhesion efficiency is better than when the coating M is applied with a spray gun. Therefore, the material cost of the coating M is reduced. The coating M is not applied to portions other than the cavity 17, which prevents the formation of a burr. Therefore, the step of removing the burr which is required in the prior art is not necessary. As a result, production cost is reduced. Further, the coating M is prevented from being scattered, which results in a clean work site, prevents waste and limits environmental damage.
(2) The coating M is uniformly applied to the wall surface of the cavity 17 due to an increase in the volume of the coating M caused by the boiling of the solvents and the breakage of foam. As a result, a urethane resin coating layer U1 having excellent light resistance is formed on the surface of the resin portion with a substantially uniform thickness after molding. Therefore, the light resistance is substantially uniform, which prevents deterioration in the appearance and performance of the product. Further, the product surface has no color difference, which improves the appearance. Moreover, when the solution of the coating M is poured into the cavity 17, the thickness of the film can be adjusted by controlling the amount of the coating M. Thus, a coating film having an appropriate thickness is formed on the parting line portion (PL portion), which has a surface substantially perpendicular to the split surface making it difficult to form a thick coating film in the prior art. Therefore, the light resistance and abrasion resistance is improved in the steering wheel 1. Since the surface of the metal mold is transferred to the surface of the coating film, a surface design can be easily provided by the metal mold 7. More specifically, a smooth surface or uneven surface can be formed on the steering wheel 1.
(3) Since the steering wheel 1 is molded such that the surface of the steering wheel that faces the driver faces downward, a urethane resin coating layer U1 is surely formed on the surface of the steering wheel that faces the driver faces. This improves the light resistance of the steering wheel 1.
(4) Since the surface of the core bar 10 is washed with the solvents of the coating M, and the urethane resin-based coating M, which has excellent adhesion, is applied to the surface of the core bar 10, the core bar 10 and the urethane resin are firmly bonded together.
(5) Since the reaction injection molding of the urethane material is carried out while the temperature and pressure of the cavity are lower than that of injection molding with thermoplastic resin, the breakage of the coating layer on the wall surface of the cavity 17 is prevented. As a result, product yield improves.
(6) In the first embodiment, coating solution No. 5 (150 g) having composition (MEK=about 85%, IPA=about 10%, urethane resin=2.5%), which is shown in Table 2, was used. Therefore, the coating solution has excellent dilutability without aggregation of the solid filler and the coatability and dryability are satisfactory.
(7) Since the slightly foamed skin layer U3 is formed around the highly foamed core portion U2, the abrasion resistance and the texture of the steering wheel 1 are improved. The coating film layer U1, which is made of a urethane resin having excellent light resistance, is formed on the surface of the resin portion with a substantially uniform thickness. As a result, the light resistance is substantially uniform. Further, the surface of the product has substantially no color difference. Even when the coating film is worn away by extended use, since the skin layer U3 is formed in the interior portion of the steering wheel, the appearance and texture of the steering wheel are retained.

Second Embodiment

Figure 6:
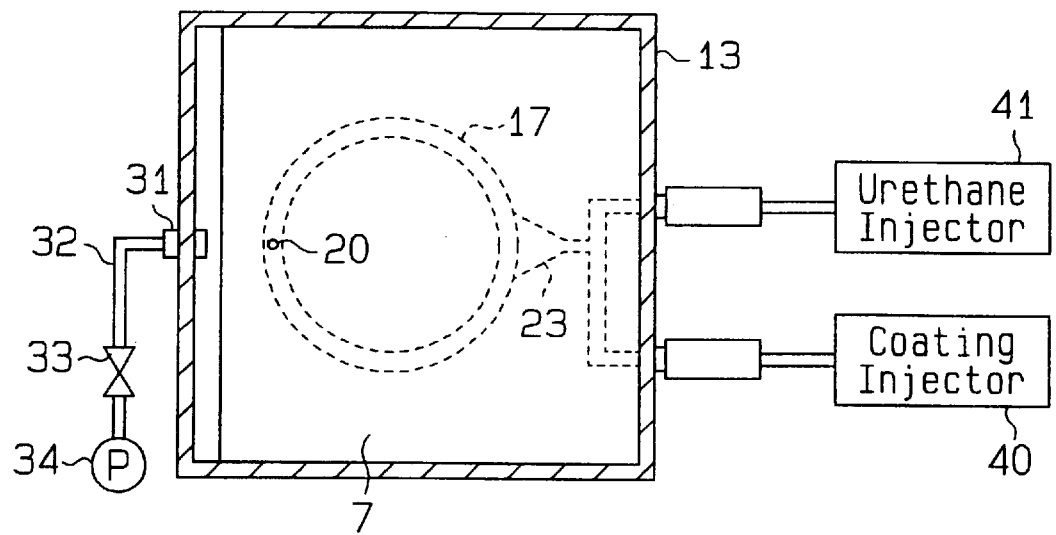
FIG. 6 is a diagram schematically showing an injection molding machine according to a second embodiment of the present invention.

The second embodiment of the present invention will be described below with reference to FIG. 6, focusing on its differences from the first embodiment.

The injection molding machine of the second embodiment has a coating injector 40. The dotted lines of FIG. 6 show the cavity 17 and the gate 23. The coating M is injected into the cavity 17 from the coating injector 40 through the gate 23. Urethane material, which has been mixed in the urethane injector 41 is injected into the cavity 17 through the gate 23. Therefore, the coating solution and the urethane material are injected into the cavity 17 through the common gate 23. In this injection molding machine, the coating solution is injected into the cavity 17 while the metal mold 7 is closed.

The molding step will be described below. A parting agent coating is first applied to the wall surface of the cavity 17, and the core bar 10 is set in the mold metal 7 and clamped. The inside of the cavity 17 is depressurized by the vacuum pump 34 to reduce the pressure in the cavity 17 to a predetermined value. The coating M is then injected into the cavity 17 from the coating injector 40. At this point, the solvents of the coating M boil, which causes the coating M to foam. The coating M flows toward the exhaust hole 20 in the cavity 17 while the foam breaks. Thus, the coating M is formed on the wall surface of the cavity 17. A urethane resin coating film is formed on the wall surface of the cavity 17 by the evaporation of the solvents.

After the coating layer is formed on the wall surface of the cavity 17, the urethane material is injected into the cavity 17 from the urethane injector 41. The urethane material reacts and cures in the cavity 17. Thus, the molded steering wheel 1 is produced.

The second embodiment has the following advantages.
(1) Since the coating M is injected while the cavity 17 is depressurized, the resin molding step is performed quickly. Since the coating M is injected into the closed metal mold 7, the coating M and the solvents do not leak from the injection molding machine.
(2) Since the amount of the coating solution injected is controlled by the coating injector 40, the thickness of the coating layer can be easily adjusted. Therefore, product variations can be reduced.

Third Embodiment

The third embodiment of the present invention will be described below, focusing on its differences from the first embodiment.

Figure 7:
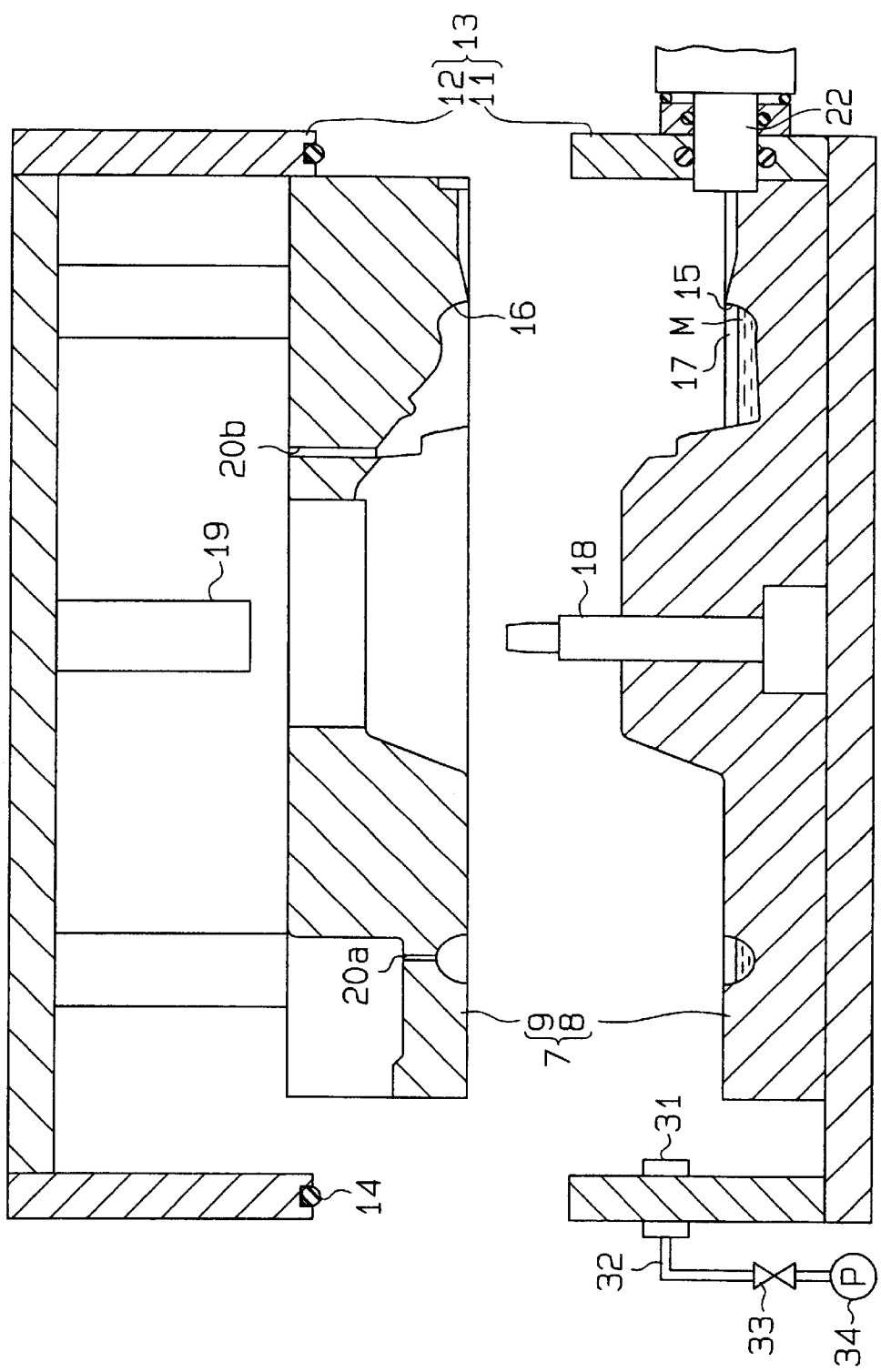
FIG. 7, FIG. 8, FIG. 9 and FIG. 10 are sectional views illustrating a process for molding a steering wheel according to a third embodiment of the present invention.
Figure 8:
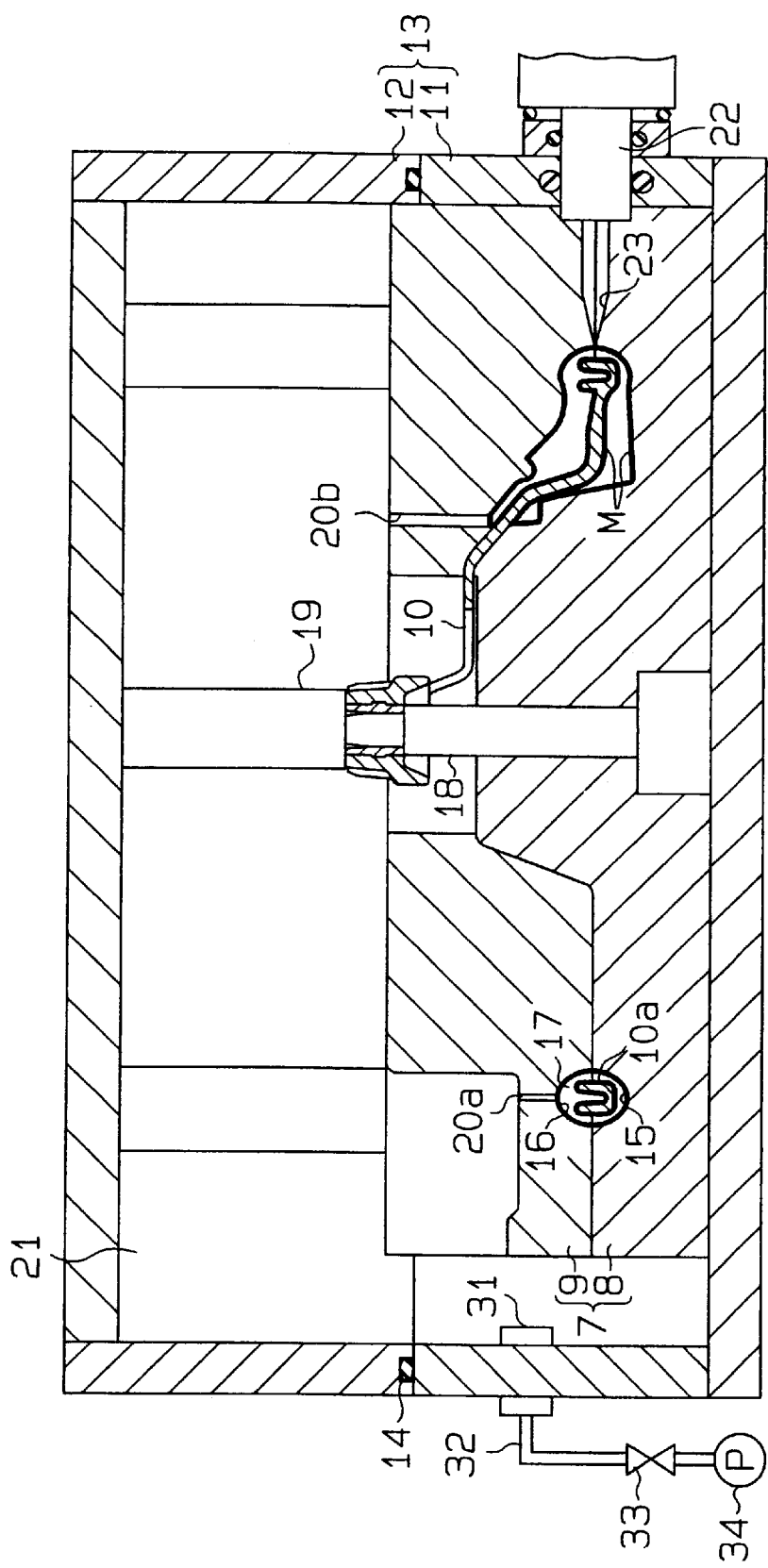
Figure 9:
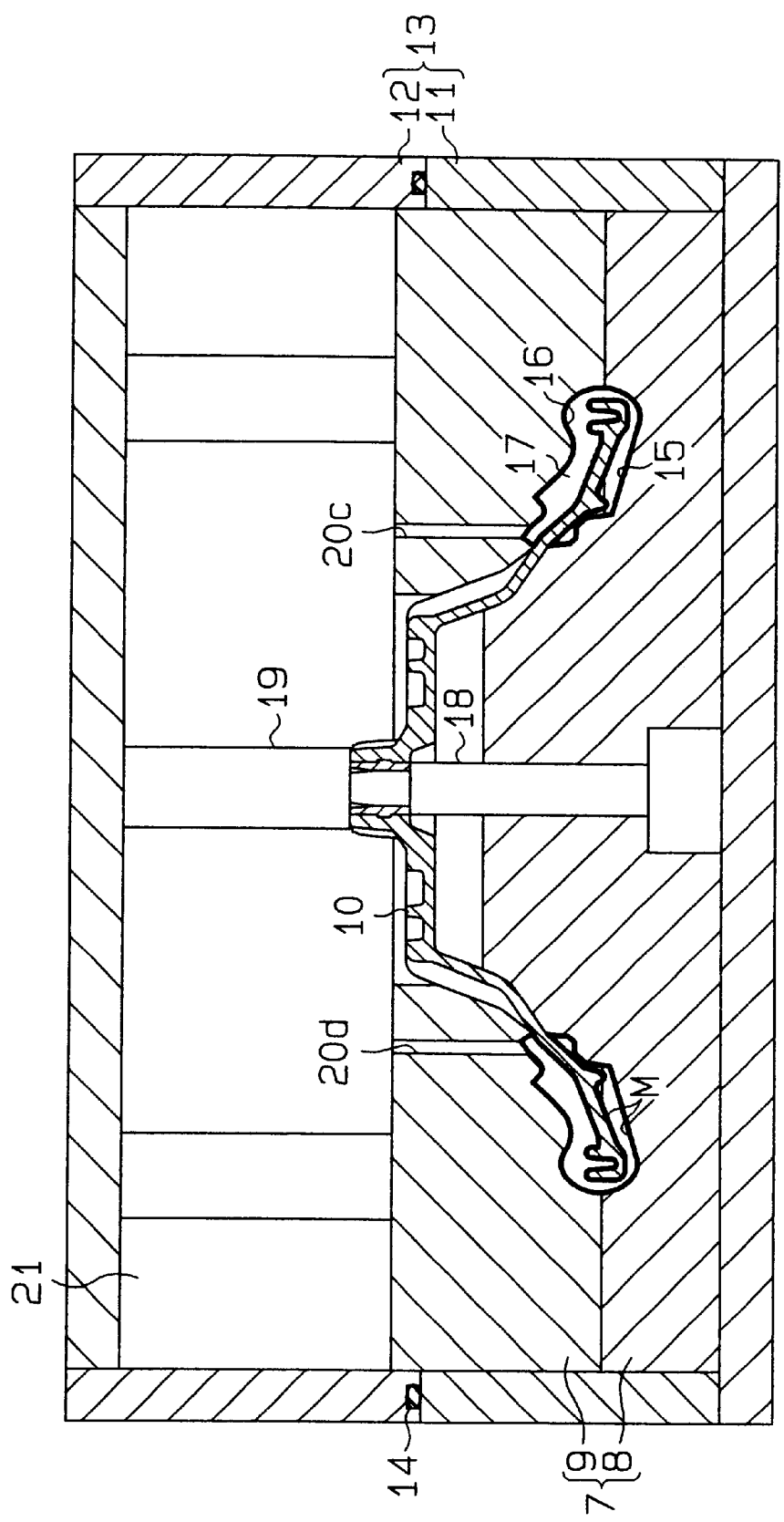
Figure 10:
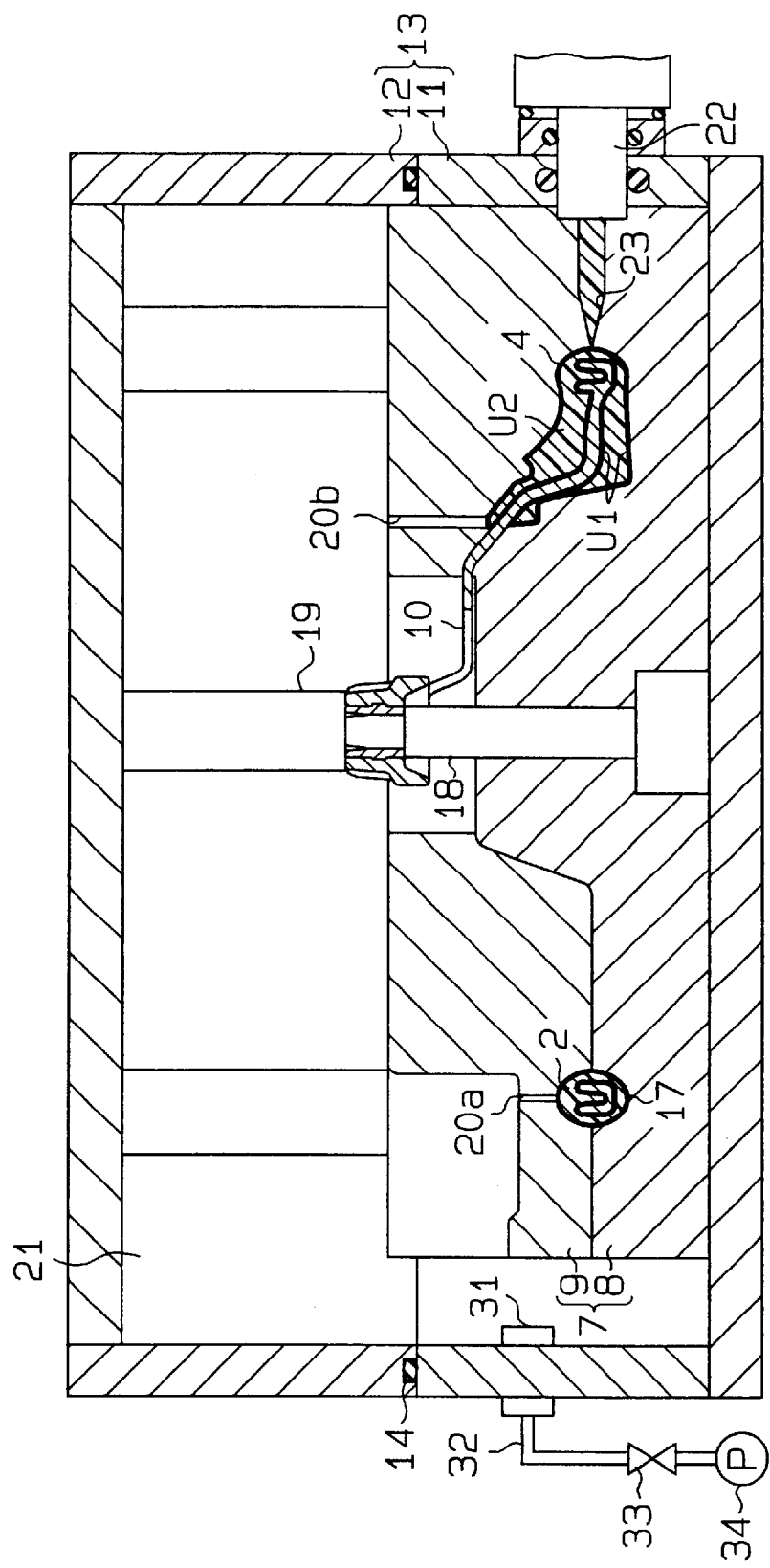

FIG. 7, FIG. 8 and FIG. 10 are sectional views taken along the spoke portion 4 of an injection molding machine. FIG. 9 is a sectional view taken along the spoke portions 3 and 5. Four exhaust holes 20a to 20d are formed in the recess portion 16 of the upper die 9. The exhaust holes 20a to 20d communicate with the cavity 17 and the hollow portion 21. The exhaust holes 20a to 20d are formed at the highest position of the cavity 17 in the metal mold 7 as shown in FIG. 8 and FIG. 9.

The urethane material is liquid and contains a polyol component, an isocyanate component and a foaming component. This urethane material is injected into the metal mold 7 from the injection nozzle 22 by an unillustrated injection machine.

The following description is of a process for molding the steering wheel 1 with reference to FIGS. 7 to 10.

As shown in FIG. 7, a parting agent is first applied to the wall surface of the cavity 17 of the opened metal mold 7. Thereafter, the coating M (170 g) is injected into the recess portion 15 of the lower die 8 while the metal mold 7 is horizontal. The coating M contains methyl ethyl ketone (MEK) and isopropyl alcohol (IPA) as solvents and a urethane resin as a solid filler.

The core bar 10 is set in the metal mold 7 as shown in FIG. 8 and FIG. 9, and the metal mold 7 is closed and clamped. The vacuum pump 34 is driven to depressurize the inside of the box 13. At this point, the air in the cavity 17 is drawn into the hollow portion 21 through the exhaust holes 20a to 20d. As a result, the pressure in the cavity 17 is uniformly reduced. In response to the reduction in the pressure in the cavity 17, the boiling points of the solvents of the coating M fall. The coating M flows toward the exhaust holes 20a to 20d while it boils. When the pressure in the cavity 17 is reduced to 300 Torr or less at while the metal mold 7 temperature is 55° C., the solvents boil. The coating M is applied to the wall surface of the cavity 17 by the volume increase and the breakage of foam during boiling. The solvents contained in the coating M evaporate and the urethane resin of the coating M adheres to the wall surface of the cavity 17. At this point, the coating M applied to the upper portion of the cavity 17 dries while it flows downward. As a result, the coating layer on the bottom side of the cavity 17 is thicker than the coating layer on the ceiling of the cavity 17. Further, in the cavity 17, the surface of the core bar 10 is washed with the solvents, and the coating M, which also functions as an adhesive, adheres to the surface of the core bar 10. The evaporated solvents are exhausted to the outside of the apparatus through the exhaust holes 20a to 20d by the vacuum pump 34.

Then, the urethane material, which is a filler material mixed in the unillustrated injection machine, is injected into the cavity 17 from the injection nozzle 22 through the gate 23. The urethane material reacts and cures in the cavity 17. To describe more specifically, the foaming component and the isocyanate component react with each other to form $CO_2$, and the polyol component and the isocyanate component react with each other to foam mold the urethane resin.

Thus, the molding and coating of the urethane resin are carried out in the grip portion 2 and the spoke portions 3, 4 and 5 simultaneously. As a result, the urethane resin coating layer U1, which is light resistant, is formed on the surface of the urethane resin layer U2. Finally, the metal mold 7 is opened and the steering wheel 1 is removed.

Since the resin molding takes place while the steering wheel 1 is upside down (the grip portion 2 faces down) in this embodiment, the thickness of the coating film increases gradually from the rear side to the front side of the steering wheel 1. The thickness of the coating film on the front side is 10 μm.

The third embodiment has the following advantages.
(1) Since the light-resistant urethane resin coating layer U1 is formed on the surface of the foamed urethane resin layer U2, discoloration of the urethane resin layer U2 is prevented. The thick coating layer is formed on the front side of the steering wheel 1, where discoloration is more conspicuous. Further, deterioration in the light resistance caused by abrasion is prevented without fail. Since a thin coating film is formed on the rear side, the material cost of the coating M is reduced. Therefore, the cost of preventing the product's appearance from deteriorating is low.

Fourth Embodiment

The fourth embodiment of the present invention will be described below, focusing on its differences from the first embodiment.

In the molding process of this embodiment, the metal mold 7 is horizontal during a period from when the coating M is injected into the cavity 17 until the cavity 17 is depressurized. This prevents the coating M from gathering in a predetermined portion of the cavity 17. As a result, the coating M is uniform on the wall surface of the cavity 17.

The peel strength of the resin portion to the core bar 10 of the steering wheel 1 produced by the molding process of this embodiment was measured.

A steering wheel 1 was prepared by injecting a coating (150 g) into the cavity 17 and reducing the pressure in the cavity 17 to 300 Torr (40 kPa) or less to form a coating film on the wall surface of the cavity 17. As a comparative prior art example, a steering wheel was prepared by forming a coating film on the wall surface of the cavity 17 with a spray gun. The results of the peel strengths of the both steering wheels are shown in Table 3. Table 3 also shows the results obtained when the method of treating the core bar 10 was changed. More specifically, the core bar 10 was washed or washed and immersed in an adhesive solution. Table 3 shows the resulting peel strengths neither of the above treatments was performed, when the washing treatment was carried out, and when both the washing treatment and the immersion treatment were carried out.

TABLE 3

| Core bar treatment | peel strength | |
| --- | --- | --- |
|  | Fourth embodiment | Prior art |
| Untreated | 10.8 Nm | 1.8 Nm |
| Washing | 12.8 Nm | 5.6 Nm |
| Washing and immersion | 14.7 Nm | 17.2 Nm |

As shown in Table 3, the peel strength of the steering wheel 1 of this embodiment was 10.8 Nm when the core bar 10 was not treated. When only the washing treatment was carried out, it was 12.8 Nm. When both the washing treatment and the immersion treatment were carried out, the peel strength was 14.7 Nm. On the other hand, the peel strength of the steering wheel of the prior art comparative example was 1.8 Nm when not treated. When only the washing treatment was carried out, it was 5.6 Nm and when both the washing treatment and the immersion treatment in an adhesive were carried out, it was 17.2 Nm.

As seen from Table 3, when the film forming method of this embodiment was employed, even if no surface treatment was performed, the peel strength was 10 Nm or more and satisfactory adhesion strength was accomplished. However, in the comparative example, the peel strength was unsatisfactory and the surface treatment of the core bar 10 was indispensable. Therefore, when the forming method of this embodiment is employed, the washing treatment and the adhesive immersion treatment can be simplified or omitted.

The efficiency of the adhesion to the cavity 17 was about 20% in the prior art comparative example. In contrast, since the coating M was applied to the wall surface of the closed cavity 17 in the fourth embodiment, the efficiency of adhesion to the cavity 17 improved to about 50 to 70%.

The fourth embodiment has the following advantages.
(1) Since the surface of the core bar 10 is washed in the cavity 17 to remove impurities adhered to the surface, adhesion between the core bar 10 and the urethane resin improves. Further, in this embodiment, the urethane resin-based coating M, which has excellent adhesion, is applied to the surface of the washed core bar 10. As a result, the core bar 10 and the urethane resin are firmly bonded to each other. Therefore, the step of washing the core bar 10 and the step of applying a coat of adhesive on the core bar 10, which are required in the prior art, can be omitted, which reduces production costs.
(2) Since the pressure in the cavity 17 is reduced while the metal mold 7 is horizontal, the coating M in the cavity cannot gather at one location and is uniformly formed on the wall surface of the cavity 17.

Fifth Embodiment

The fifth embodiment of the present invention will be described below, focusing on the differences from the first embodiment.

The urethane material of the fifth embodiment contains a liquid polyol component (for example, polyether polyol), isocyanate component (for example, diphenylmethane diisocyanate) and water as a foaming agent.

A description of a process for molding a urethane resin into the steering wheel 1 of this embodiment follows. Like the first embodiment, the metal mold 7 is first opened and a parting agent is coated on the wall surface of the cavity 17. Thereafter, the liquid coating M (150 g) is injected into the lower recess portion 15 while the metal mold 7 is horizontal. The core bar 10 is set in the metal mold 7, which is then closed and clamped. The vacuum pump 34 is driven to reduce the pressure in the box 13. Then, the solvents of the coating M boil, and the urethane resin of the coating M adheres to the wall surface of the cavity 17. After the coating M is fully dried, the vacuum pump 34 is stopped.

After the pressure in the cavity 17 reaches normal pressure, the liquid urethane material, which has been mixed by an unillustrated urethane injector, is injected into the cavity 17 from the injection nozzle 22 through the gate 23 and reacts and cures in the cavity 17 as shown in FIG. 3. To describe more specifically, water and the isocyanate component react with each other to form $CO_2$, and the polyol component and the isocyanate component react with each other to foam and mold the urethane resin simultaneously (refer to Japanese Unexamined Patent Publication No. Hei 5-57735). As a result, the molding and coating of the urethane resin of the grip portion 2 and the spoke portions 3, 4 and 5 of the steering wheel 1 are carried out simultaneously.

The fifth embodiment has the following advantages.
(1) The light-resistant urethane resin coating layer U1 is formed on the surface of the urethane resin layer U2, which is molded by foaming with water to a substantially uniform thickness.

Sixth Embodiment

In this embodiment, polypropylene (PP) or the like, which has excellent moldability and is light and inexpensive, is used as the molding material. Since polypropylene has poor weather resistance, the surface of a polypropylene resin molded portion is covered with a coating layer having excellent weather resistance. In the sixth embodiment, a back panel 71, which is located between a pair of right and left tail lamps of an automobile, is molded using the metal mold 7.

Figure 11:
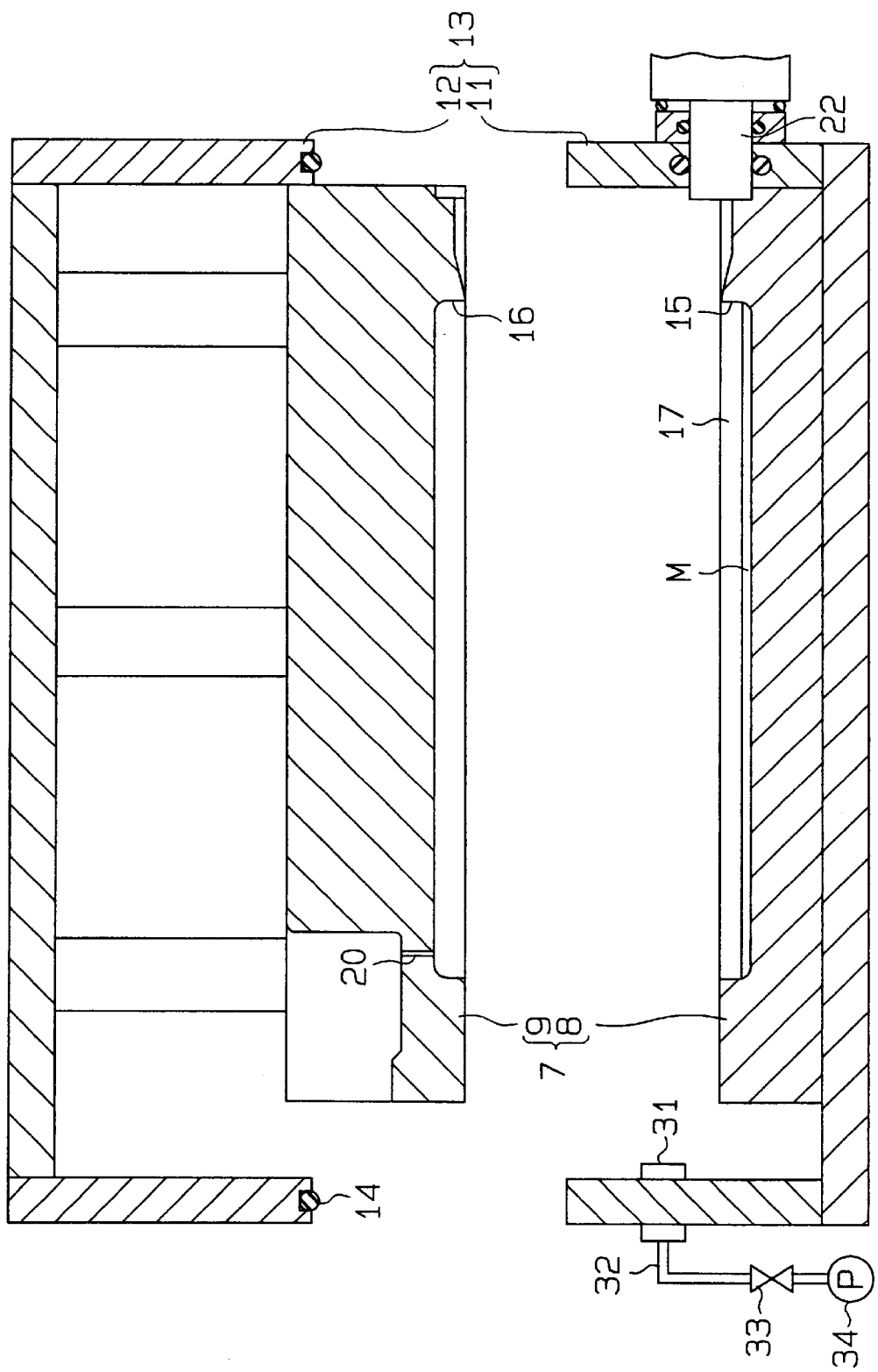
FIGS. 11 to 13 are diagrams for explaining a process for molding a back panel according to a sixth embodiment of the present invention.
Figure 12:
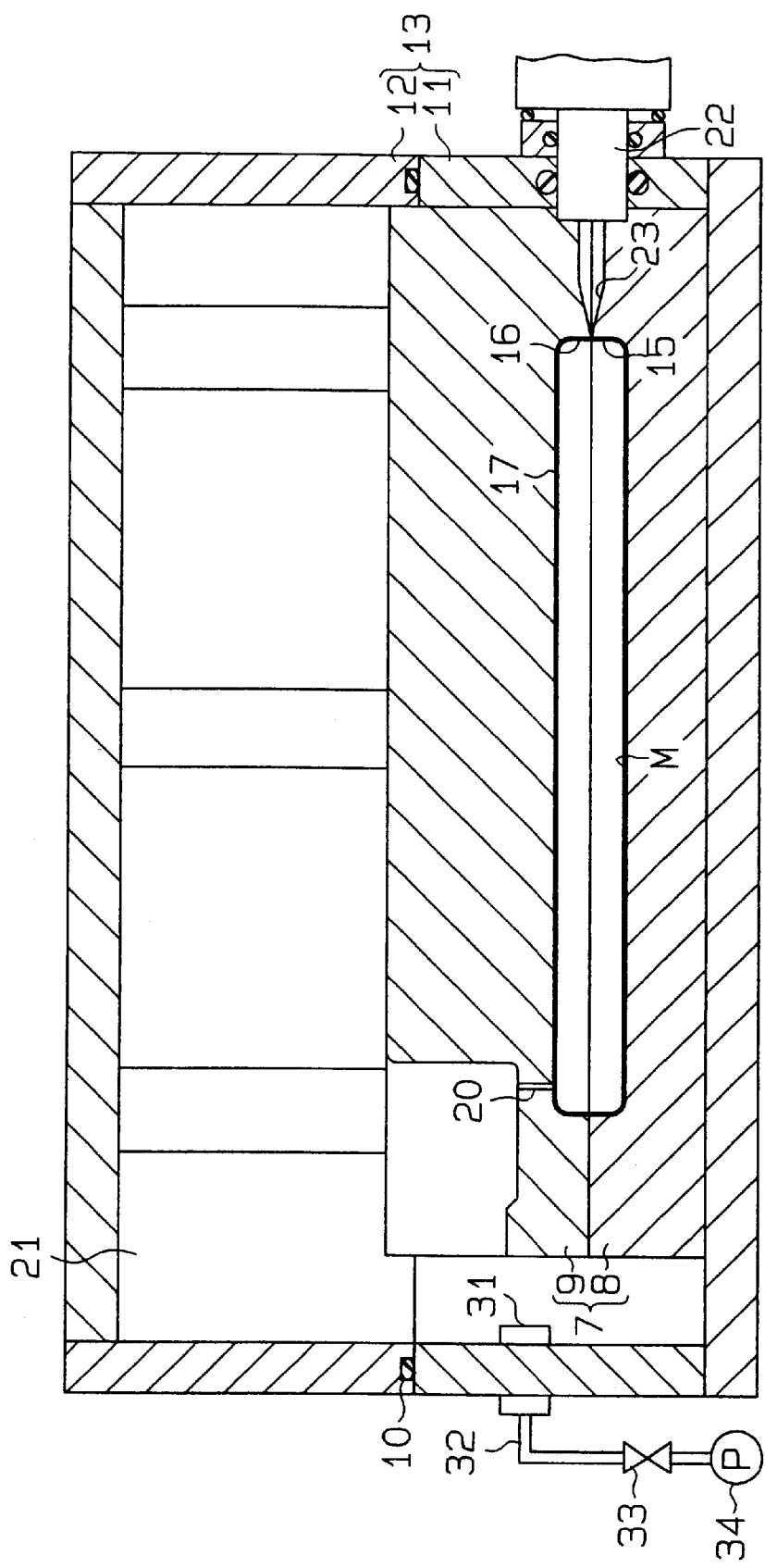
Figure 13:
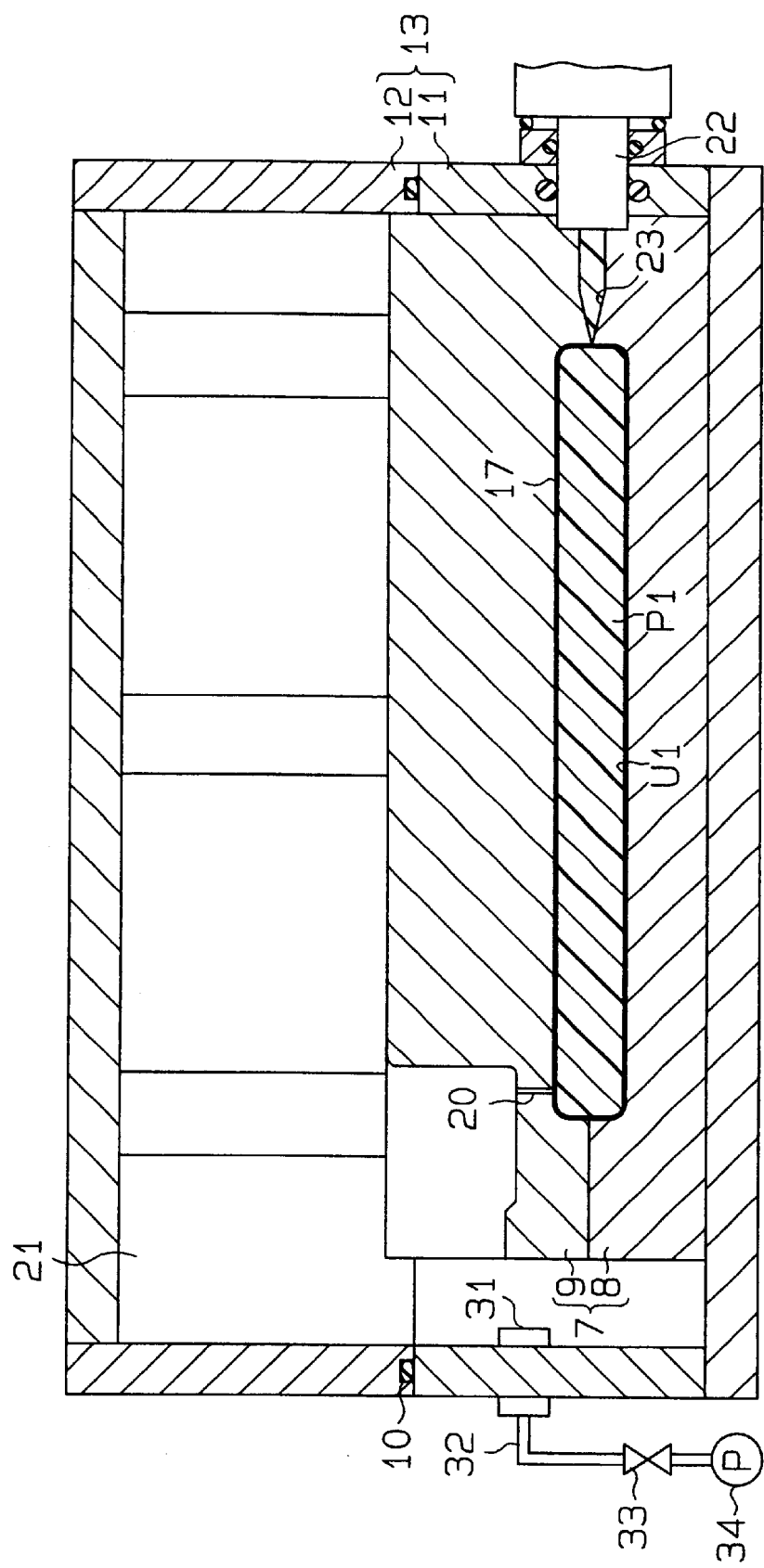

As shown in FIGS. 11 to 13, the metal mold 7 is placed in the box 13, which includes the frame 11 and the cover 12. An exhaust hole 20 is formed in the upper recess portion 16 of the upper die 9. The exhaust hole 20 communicates with the cavity 17 and the hollow portion 21. The exhaust hole 20 is also formed at positions corresponding to the corner portions 1a of the back panel 71 shown in FIG. 14. Polypropylene is injected into the cavity 17 from the injection nozzle 22 of an unillustrated injection machine.

A description of a process for molding a resin into the back panel 71 follows.

As shown in FIG. 11, the metal mold 7 is first opened to apply a parting agent coating on the wall surface of the cavity 17 (the recess portion 15 of the lower die 8 and the recess portion 16 of the upper die 9). Thereafter, the liquid coating M is injected into the recess portion 15 of the lower die 8 while the metal mold 7 is horizontal. The solution of the coating M in this embodiment contains methyl ethyl ketone (MEK) and isopropyl alcohol (IPA), which are solvents, and a urethane resin, which is a solid filler.

The frame 11 and the lower die 8 are moved to close the metal mold 7 as shown in FIG. 12. The vacuum pump 34 is then driven to remove air from the box 13. At this point, the air in the cavity 17 is drawn into the hollow portion 21 through the exhaust hole 20, thereby reducing the pressure in the cavity 17. When the pressure in the cavity 17 is reduced, the boiling points of the solvents (MEK, IPA) of the coating M fall. The temperature of the metal mold 7 is maintained at normal temperature (about 20° C.). When the pressure in the cavity 17 reaches 70 Torr, the solvents boil. Due to the boiling of the solvents, the coating M is coated on the wall surface of the cavity 17. Then, the solvents of the coating M evaporate and the urethane resin adheres to the wall surface of the cavity 17. The evaporated solvents are exhausted from the exhaust holes 20 through the hollow portion 21 in the box 13 and the exhaust pipe 31 by the vacuum pump 34.

Figure 14:
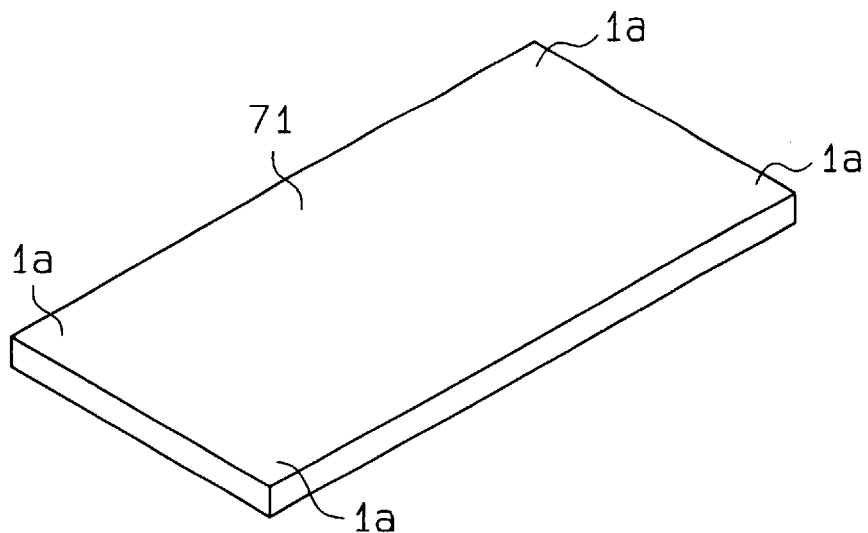
FIG. 14 is a perspective view of the back panel of the sixth embodiment.

Then, polypropylene, the flowability of which has been improved by heating in the unillustrated injection machine, is injected into the cavity 17. The polypropylene is cooled and cured in the cavity 17 as shown in FIG. 13. At this point, a urethane resin coating layer U1 that has excellent weather resistance is formed on the surface of a polypropylene portion P1, which is injection molded and has a substantially uniform thickness. Finally, the metal mold 7 is opened and the back panel 71 of FIG. 14 is taken out.

When the coating M was applied with a spray gun, as in the prior art, the efficiency of adhesion to the cavity 17 was about 20%. In contrast, when the coating M was formed on the wall surface of the closed cavity 17, as in this embodiment, the adhesion efficiency to the cavity 17 improved to about 50 to 70%.

As described above, according to this embodiment, even when polypropylene is used, the advantages effects of the first embodiment are likewise achieved.

Seventh Embodiment

The seventh embodiment of the present invention will be described below with reference to the drawing. This embodiment differs from the sixth embodiment in that a coating injector is provided.

Figure 15:
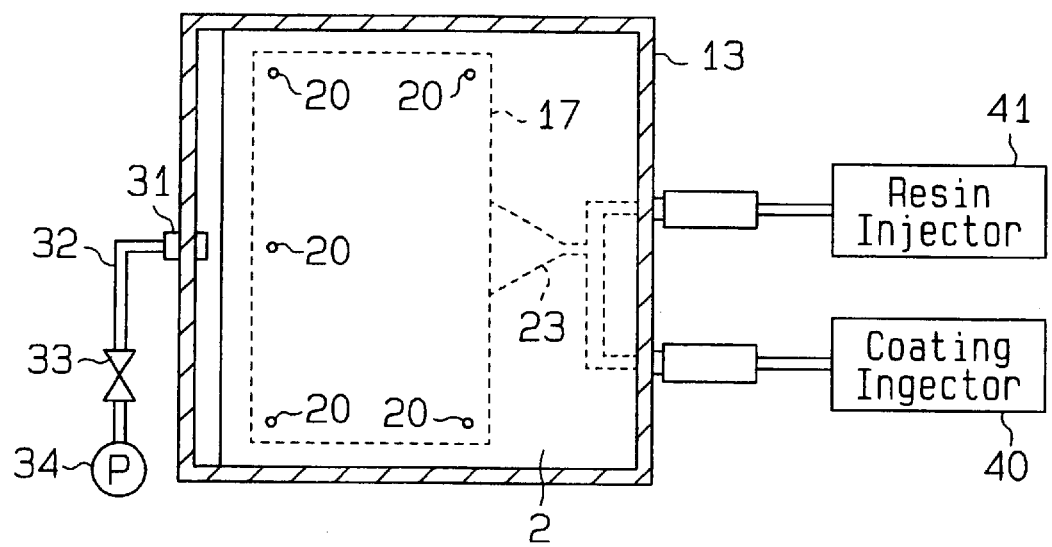
FIG. 15 is a diagram schematically showing an injection molding machine according to a seventh embodiment of the present invention.

FIG. 15 is a diagram substantially showing the construction of an injection molding machine and showing the cavity 17 and the gate 23 by dotted lines. The coating M is injected into the cavity 17 from the coating injector 40 through the gate 23. Polypropylene, which is heated by the resin injector 41 and has a low flow resistance, is injected into the cavity 17 through the gate 23. That is, the coating M and the polypropylene are injected into the cavity 17 through the common gate 23. When the injection molding machine is thus constructed, the coating M can be injected into the cavity 17 while the metal mold 7 is closed.

More specifically, after a coating of parting agent is applied to the wall surface of the cavity 17, the metal mold 7 is closed. The vacuum pump 34 is then driven to reduce the pressure in the cavity 17, and the coating M is injected into the cavity 17 from the coating injector 40 when the pressure in the cavity 17 is reduced to a predetermined value or less. At this point, the solvents of the coating M boil and the foamed coating M flows toward the exhaust holes 20 in the cavity 17 while the foam breaks. Thus, the coating M is applied to the wall surface of the cavity 17. Then, the solvents of the coating M evaporate and the urethane resin coating M is formed on the wall surface of the cavity 17.

After the coating layer is thus formed on the wall surface of the cavity 17, the heated polypropylene is injected into the cavity 17. The polypropylene cures in the cavity 17 to form the back panel 71.

According to this embodiment, the advantages effects of the sixth embodiment are likewise achieved.

Eighth Embodiment

The eighth embodiment of the present invention will be described below with reference to the drawing. In this embodiment, the same injection molding machine as in the first embodiment is used. The injection nozzle 41a of the urethane injector 41 is installed in the side wall of the frame 11. The urethane material is mixed in the urethane injector 41 and injected into the cavity 17 from the injection nozzle 41a. The urethane material contains a polyol component, an isocyanate component and a coloring component. These three components are mixed in the urethane injector 41.

Figure 16:
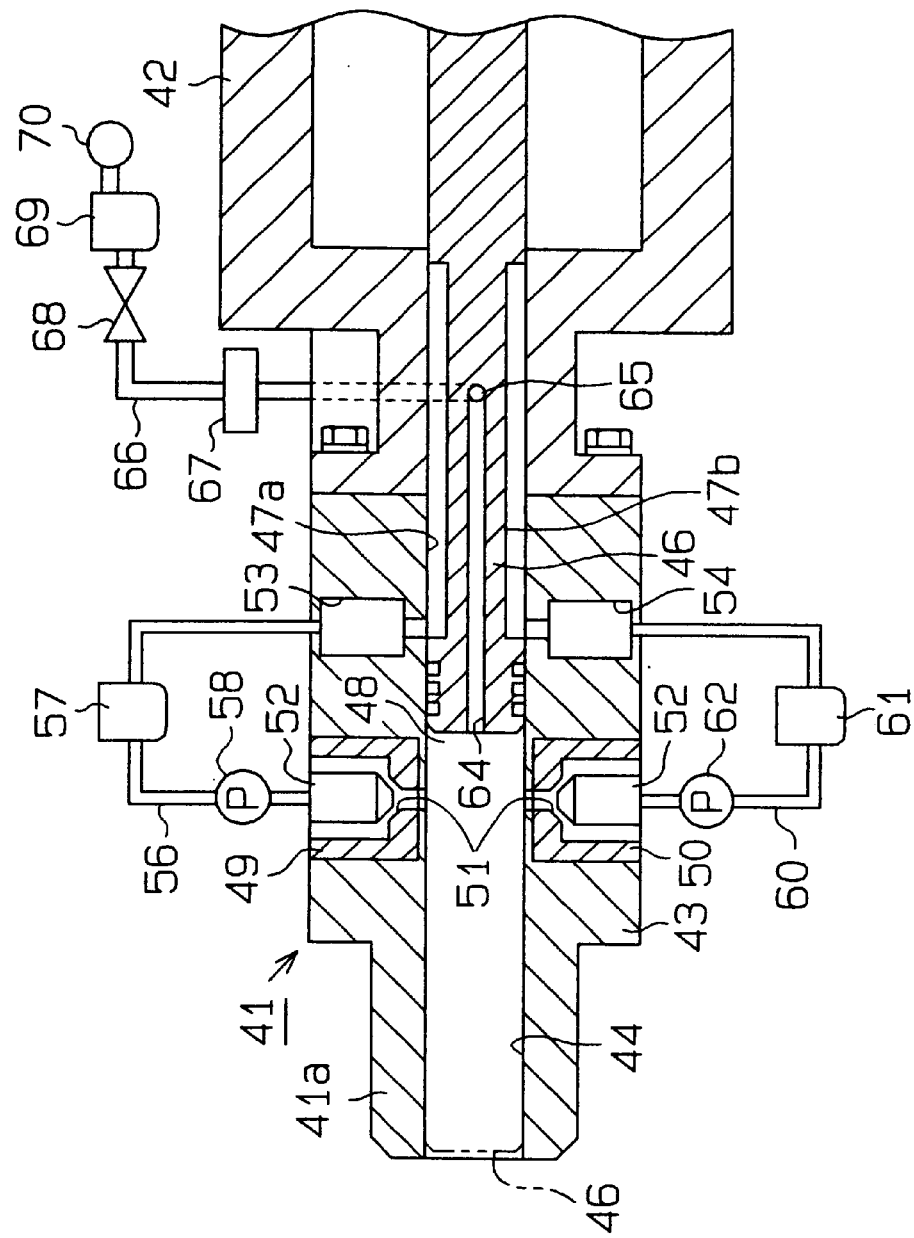
FIG. 16 is a diagram schematically showing the urethane injector of an injection molding machine according to an eighth embodiment of the present invention.

The urethane injector 41 will be described below with reference to FIG. 16.

The urethane injector 41 has a cylinder 42 and a body 43, which is at the end of the cylinder 42 and continuous with the cylinder 42. The injection nozzle 41a is formed at the end of the body 43. The injection nozzle 41a is connected to the side wall of the frame 11.

A through hole 44 is formed in the inside of the body 43. A spool 46 is inserted into the through hole 44 so that it can move therein. The spool 46 is attached to a piston (not shown) which reciprocates in the cylinder 42. The spool 46 is moved by piston between a forward position, shown by broken line, and a rear position, shown by a solid line in FIG. 16. A pair of grooves 47a and 47b, which extend in the longitudinal direction of the spool 46, are formed in the outer wall of the spool 46. A mixing chamber 48 is defined by the end surface of the spool 46 and the wall of the through hole 44.

Two cylindrical nozzles 49 and 50 are installed in the body 43 and are opposed to each other. The polyol component is discharged from the first nozzle 49. The isocyanate component is discharged from the second nozzle 50. An orifice 51, which is open to the mixing chamber 48 or the grooves 47a and 47b, is formed in the nozzles 49 and 50. The opening of the orifice 51 is controlled by a needle 52.

A reflux hole 53 for the polyol component and a reflux hole 54 for the isocyanate component are formed in the body 43 and communicate with the grooves 47a and 47b, respectively. The first nozzle 49 and the reflux hole 53 are connected to a tank 57 and a pump 58 for the polyol component by a hose 56. The polyol component flows from the tank 57 to the pump 58, nozzle 49, groove 47a and reflux hole 53 and returns to the tank 57. The nozzle 50 and the reflux hole 54 are connected to a tank 61 and a pump 62 for the isocyanate component by a hose 60. The isocyanate component flows from the tank 61 to the pump 62, nozzle 50, groove 47b and reflux hole 54 and returns to the tank 61.

A discharge passage 64 for discharging the coloring component is formed in the center of the spool 46. The discharge passage 64 connects the end surface of the spool 46 to the outer surface of the spool 46. An introduction hole 65, which communicates with the discharge passage 64 only when the spool 46 moves backward (rightward in FIG. 16), is formed in the body 43. A hose 66 connects the introduction hole 65, a flow controller 67, a valve 68 and a tank 69 for the coloring component. The inside of the tank 69 is always pressurized by an air pressurizing unit 70. The opening of the valve 68 is controlled by a timer or the like. The amount of material discharge from the discharge passage 64 is controlled by the opening/closing timing of the valve 68 and the flow controller 67. A pigment, which serves as the coloring component, is dispersed in the polyol component and stored in the tank 69. The coloring material is discharged from the discharge passage 64 through the valve 68 and the flow controller 67.

The coloring material discharged from the discharge passage 64, the polyol component discharged from the nozzle 49 and the isocyanate component discharged from the nozzle 50 are mixed together in the mixing chamber 48. The urethane material is injected into the cavity 17 from the injection nozzle 41a when the spool 46 moves forward.

A description follows of a process for molding a urethane resin into the steering wheel 1 of this embodiment with reference to FIGS. 1 to 3. The urethane resin contained in the coating M has the same color as the inner urethane resin.

As shown in FIG. 1, the metal mold 7 is first opened to permit a parting agent to be coated on the wall surface of the cavity 17. Thereafter, the liquid coating M (170 g in this embodiment) is injected into the recess portion 15 of the lower die 8 while the metal mold 7 is horizontal.

The core bar 10 is then set in the metal mold 7 and the metal mold 7 is closed. The vacuum pump 34 is driven to reduce the pressure in the box 13 and the cavity 17. When the pressure in the cavity 17 is reduced, the boiling points of the solvents (MEK, IPA) of the coating M fall. The temperature of the metal mold 7 is maintained at 55° C. When the pressure in the cavity 17 is reduced to 300 Torr or less, the solvents boil. The coating M is formed on the wall surface of the cavity 17 by a volume increase and the breakage of foam during boiling. When the solvents of the coating M evaporate, the coating layer is formed on the wall surface of the cavity 17. At this point, the surface of the core bar 10 in the cavity 17 is washed with the solvents of the coating M and the coating M, which functions as an adhesive, adheres to the surface of the core bar 10. The pressure in the cavity 17 is reduced to 50 Torr and the solvents evaporate in about 60 seconds. The evaporated solvents are exhausted from the exhaust hole 20 through the hollow portion 21 in the box 13 and the exhaust pipe 31 by the vacuum pump 34.

Thereafter, the urethane material, which has been mixed in the urethane injector 41 is injected into the cavity 17 while the reduced pressure is maintained. The urethane material cures in the cavity 17. Consequently, a slightly foamed skin layer U3 and a highly foamed core portion U2 are formed on the inner side of the urethane resin coating layer U1.

More specifically, the spool 46 is moved backward to discharge the polyol component from the nozzle 49 and the isocyanate component from the nozzle 50 into the mixing chamber 48. At the same time, the valve 68 is opened to discharge the coloring material into the mixing chamber 48 from the discharge passage 64 so that it collides with and mixes with the above components. At this point, the concentration of the pigment contained in the urethane material is controlled to 40% of the standard concentration, for example. When the spool 46 is moved forward, the mixed urethane material is injected into the cavity 17 from the injection nozzle 41a. That is, the first urethane material, which contains pigment in a concentration that is 40% of the standard concentration, is injected into the cavity 17 (first injection step).

Then, gas contained in the urethane material expands suddenly under reduced pressure and forms a large number of bubbles. As a result, the urethane material foams in a short period of time and fills the cavity 17 while it flows. Simultaneous with the foaming of the urethane material, a reaction (urethane reaction) between the polyol component and the isocyanate component in the urethane material starts. During this reaction, heat is generated which promotes reaction curing. At this point, reaction heat is transmitted to the metal mold 7 in the proximity of the wall surface of the cavity 17, resulting in a temperature reduction. Therefore, the urethane reaction is slower in the proximity of the wall surface. Also the urethane material near the wall surface has a lower viscosity than that in the interior of the urethane material. As a result, bubbles near the surface easily break, and a slightly foamed fine skin layer U3, where even very small bubbles do not remain, is formed. Meanwhile, since the viscosity of the interior portion away from the wall surface of the cavity 17 is raised by the urethane reaction, which proceeds swiftly, bubbles remain in that portion. As a result, a high foamed core portion U2 is formed. Thus, the skin layer U3 is formed on the surface of the high foamed core portion U2, thereby providing soft and solid feel.

Subsequently, the amount of the coloring component discharged into the mixing chamber 48 from the discharge passage 64 is increased, and a urethane material the pigment concentration of which is set at a standard level (100%), is injected into the cavity 17 from the injection nozzle 41a. That is, the second urethane material containing a larger amount of a pigment than the first urethane material is injected (second injection step). Consequently, the urethane resin of a portion near the gate is molded. Therefore, even if the urethane resin remaining in the gate portion is cut off later, urethane resin containing a standard concentration of pigment is exposed, which prevents a defects in the appearance.

Figure 17:
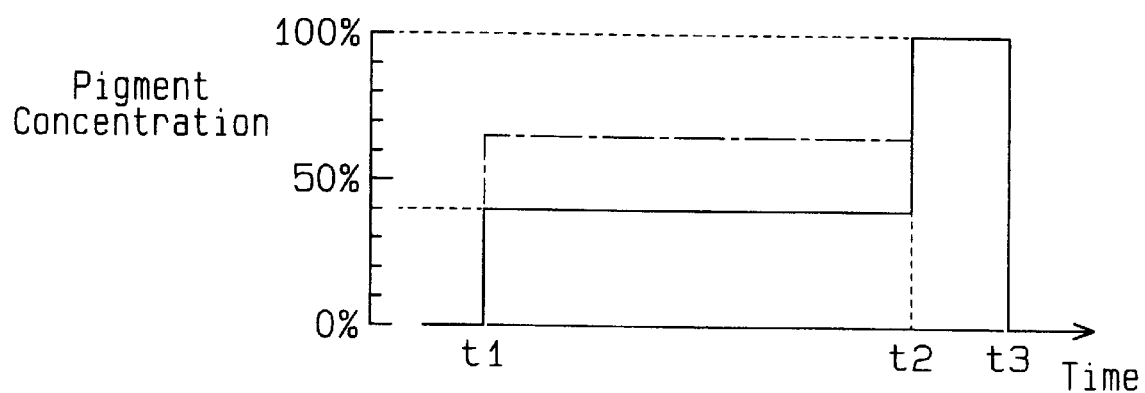
FIG. 17 is a timing chart showing changes in the concentration of a pigment in the foam molding step of the eighth embodiment.

FIG. 17 is a timing chart showing changes in the concentration of the pigment in the above molding. That is, as shown in FIG. 17, in the first injection step which occurs a period from t1 to t2, the skin layer U3 and the core portion U2 are formed by setting the pigment concentration at 40% of the standard level. In the second injection step, which occurs in a period from t2 to t3, the portion near the gate is formed with resin having the standard pigment concentration (100%).

When the steering wheel 1 is thus molded, the concentration of the pigment in the skin layer U3 underlying the coating layer is 40%, which is lower than the standard concentration, and the core portion U2 has a relatively lower pigment concentration and a lighter color than the skin layer U3 because the core portion U2 is foamed. Since the color of the layered parts of the steering wheel 1 is perceived as a sum of the colors of the layers U1, U2, U3, the color of the exposed part, where the gate material was removed and where the pigment concentration is high, appears to be the same as the remainder of the steering wheel 1, the layers of which have lower pigment concentrations.

A one-dot chain line in FIG. 17 shows a comparative example in which the coating M was applied with a spray gun before the foam molding of the urethane material was carried out. In this case, a burr was formed on the parting line and a highly foamed core portion was exposed by removing the burr. Therefore, during a period from t1 to t2 when the skin layer and the core portion were formed, the concentration of the pigment had to be increased (for example, to 65%) so that no color defect would appear where the burr was cut away. However, in the present invention, the coating M is only applied to the walls of the cavity 17, and a burr is not formed on the parting line, which makes it possible to reduce the concentration of the pigment.

The eighth embodiment has the following advantages.
(1) Although the concentration of the pigment in the skin layer U3 is lower than that of the urethane resin near the gate, the degree of coloration of the skin layer U3 is almost the same as that of the urethane resin near the gate because there are almost no bubbles in the skin layer U3.

The coating M is not applied to surfaces outside the cavity 17, which prevents burrs. Therefore, the exposure of the core portion U2 by the removal of a burr is prevented. Further, when the coating M is applied with a spray gun (mold coating), the coating M is not uniform. In particular, the coating near the parting line is too thin. However, in this embodiment, a substantially uniform film having a desired thickness formed on the surface of the skin layer U3. Therefore, the urethane resin is covered with the coating film, which makes it possible to reduce the concentration of the pigment contained in the skin layer U3 and the core portion U2. Even if gate material is cut off, urethane resin having a standard concentration of a pigment is exposed, which prevents a defect in the appearance.

As described above, the concentration of the pigment contained in the urethane material can be reduced and the material costs can be reduced without sacrificing the product appearance. The pigment particles abrade parts of the urethane injector 41. However, since the concentration of the pigment can be reduced as described above, the abrasion is reduced. Consequently, the maintenance costs of the urethane injector 41 are reduced.

The above embodiments can be modified as follows.

In the second embodiment, the coating M may be injected before depressurization.

In the second embodiment, the coating solution may be injected into the cavity 17 from a location other than the gate 23. Alternatively, it may be injected into the cavity 17 from a plurality of locations. In this case, the coating M can be efficiently applied to the wall surface of the cavity 17.

In the first to sixth embodiments and the eighth embodiment, a rubber material and other various kinds of materials may be used as the molding material. Products that can be molded in these embodiments include an instrument panels, console boxes, glow boxes, headrests, armrests, door covers, air spoilers and bumpers. Further, the present invention may be applied to the molding of home electric appliances and the like.

In the seventh embodiment, ABS resin and other thermoplastic materials, that flow resistance of which is improved by heating, may be used. A thermoplastic resin that has absorbed gas at a high pressure may be injected into the cavity 17 at normal pressure and foam molded. This eliminates the need to reduce the molding pressure in the cavity 17 and prevents breakage of a coating layer formed in the cavity 17. The molding process proposed in Japanese Patent Publication No. Hei 7-119022 may be used as an alternative molding process. In this molding process, a molten thermoplastic resin is injected into a resin pool. Then, the metal mold is closed to fill the thermoplastic resin contained in the resin pool into a resin injection space for molding. Also in this case, the pressure is lowered during molding, which prevents the breakage of a coating layer.

In each of the above embodiments, the components of the coating M can be suitably changed. More specifically, other thermosetting resin may be used in place of a urethane resin. As a solvent for the coating M, for example, water may be used. From a practical point of view, a solvent having a boiling point of about 160° C. or less at normal pressure may be used.

In each of the above embodiments, the pressure in the cavity 17 may be changed to about 70 Torr when the temperature in the metal mold 7 is about room temperature (about 20° C.). The reduced pressure in the cavity 17 may be suitably changed according to the temperature of the metal mold 7 and the types of the solvents used.

In the first and second embodiments, the coating M may be boiled by heating the metal mold 7 to the boiling points of the solvents under atmospheric pressure without reducing the pressure in the cavity 17.

In the fourth embodiment, the coating M may be injected into the cavity 17 under normal pressure from the coating injector 40 before depressurization instead of after depressurization.

In the fourth embodiment, a foaming agent that is evaporated by reaction heat between the polyol component and the isocyanate component may be used for foam molding in place of $CO_2$ that is formed by the reaction between the isocyanate component and the foaming component.

The insert member may be made of a resin or glass.

In the fourth embodiment, the step of washing the core bar 10 and the step of applying an adhesive on the core bar 10 may be carried out. In this case, the adhesion strength can be improved. The amount of adhesive to be applied to the insert member can be reduced according to the adhesion strength of the coating layer, which reduces material costs.

In the eighth embodiment, since the interior core portion U2 may be concealed by the skin layer U3 and the coating film (urethane resin layer U1) according to the shape, color and the like of a molded product, the concentration of pigment in the core portion U2 may be reduced.

Figure 18:
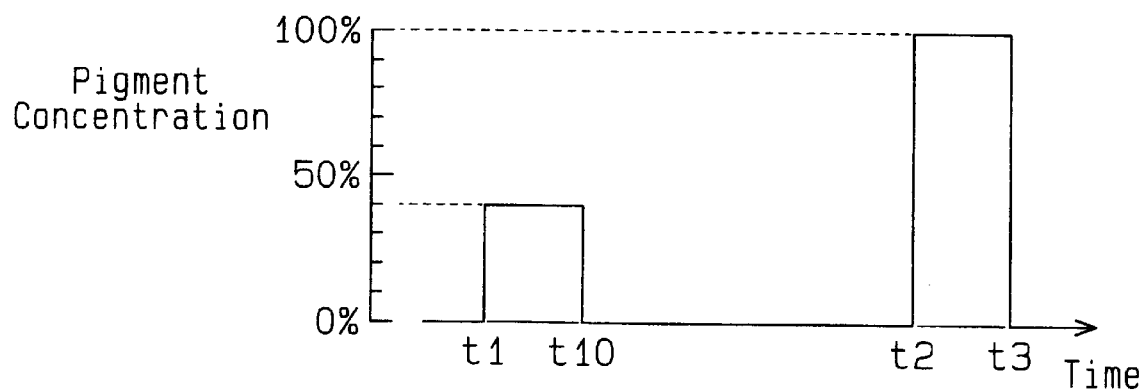
FIG. 18 is a timing chart showing changes in the concentration of a pigment in another foam molding step.

More specifically, during a period from t1 to t10 shown in FIG. 18, a first urethane material that has a pigment concentration of 40% is injected to form the skin layer U2. During a period from t10 to t2, a urethane material that contains no pigment is injected to form the interior core portion U2. Further, during a period from t2 to t3, a second urethane material, which has a standard pigment concentration (100%), is injected to deposit urethane resin near the gate. During a period from t10 to t2, the injection of urethane material having a pigment concentration of 0% may be omitted, and a urethane material (third urethane material) having a lower pigment concentration than at least the first urethane material may be injected. In the molding process shown in FIG. 18, the injection step during from t1 to t10 corresponds to the first injection step, and the injection step during from t2 to t3 corresponds to the second injection step. An injection step between the first injection step and the second injection step, that is, an injection step from t10 to t2 corresponds to the third injection step.

In the eighth embodiment, the pigment concentrations of the skin layer U3 and the core portion U2 may be suitably changed according to the shape, color and the like of a molded product. To describe more specifically, for example, during a period from t1 to t2 when the skin layer U3 and the core portion U2 are formed, foam molding may be carried out by gradually reducing the concentration of pigment. When a steering wheel is molded in the above embodiments, the concentration of the pigment in the urethane material for the surface portion is preferably reduced to 40 to 80% of the standard level. The concentration of the pigment in the urethane material for the interior portion is preferably reduced to 30 to 70% of the standard level.

In the eighth embodiment, a coating injector is provided separately to inject the coating M into the cavity 17 while the metal mold 7 is closed. Since the coating solution can be injected into the cavity 17 under reduced pressure in this case, the resin molding step can be carried out in a short period of time. The coating solution does not leak.

In each of the above embodiments, the molding machine may be equipped with a unit for collecting the coating.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A process for manufacturing a molded product having a coating layer on the surface, comprising:

preparing a coating solution containing a coating material and at least one solvent, wherein the at least one solvent evaporates under reduced pressure, and filling a cavity of a mold with the coating solution; then closing the mold; then reducing pressure in the cavity whereby a coating layer is formed on the wall surface of the cavity by evaporating the at least one solvent from the coating solution in the cavity while the mold is closed such that the coating material is distributed on the walls of the cavity by means of evaporation of the solvent; and then supplying a filler material in the cavity while the cavity is under reduced pressure.

2. The process according to claim 1, wherein the coating layer is formed on the wall surface of the cavity by increasing the volume of the coating solution in the cavity.

3. The process according to claim 1, wherein the filler material contains a urethane material that reacts and cures in the cavity.

4. The process according to claim 1, wherein the coating solution contains at least one of methyl ethyl ketone and isopropyl alcohol as the solvent and a urethane resin.

5. The process according to claim 1, wherein the mold is heated to facilitate the formation of said coating layer.

6. The process according to claim 1, wherein the mold has a lower mold die and an upper mold die and wherein the coating solution is poured in a cavity of the lower mold die.

7. A process for molding a steering wheel in a mold having a mold cavity, wherein the cavity is formed such that a grip portion of the steering wheel faces downward, comprising:

preparing a coating solution containing a coating, material and at least one solvent, wherein the at least one solvent evaporates under reduced pressure, and filling a cavity of the mold with the coating solution; then closing the mold; then boiling the coating solution in the mold cavity to evaporate the solvent, during which boiling a coating layer is formed on the wall surface of the cavity by distribution of the coating material from the coating solution by means of evaporation of the solvent; and then supplying a predetermined filler material in the cavity.

8. The process according to claim 7, further comprising depressurizing the cavity to facilitate evaporation during said boiling.

9. The process according to claim 8, wherein the depressurizing includes exhausting gas in the cavity through a passage connected to the upper position of the cavity.

10. A process for manufacturing an insert molded product, comprising:

preparing a coating solution containing a coating material and at least one solvent, wherein the at least one solvent evaporates under reduced pressure, and filling a cavity of the mold with the coating solution; and setting an insert member in a mold; then closing the mold; then forming a coating layer on rile wall surface of the cavity in the mold by evaporating the at least one solvent from the coating solution in the cavity while the mold is closed such that the coating material is distributed on the walls of the cavity by means of evaporation of the solvent; and then supplying a filler material into the cavity while the cavity is under reduced pressure.

11. The process according to claim 10, wherein forming a coating layer includes boiling the coating solution in the cavity for evaporating the solvent in the cavity, wherein a coating layer is formed on the wall surface of the cavity in the mold from the coating solution during boiling.

12. A method of forming a coating on the wall surface of a cavity in a mold comprising:

preparing a coating solution containing a coating material and at least one solvent, wherein the at least one solvent evaporates from the coating solution under reduced pressure; then closing the mold; then filling a cavity of the mold with the coating solution; and then depressurizing the cavity whereby a coating layer is formed on the wall surface of the cavity by distribution of the coating material on the walls of the cavity by means of evaporating the at least one solvent from the coating solution.

13. The method according to claim 12, wherein said depressurizing is carried out until the coating solution boils.

14. A method of forming a coating on the wall surface of a cavity in a mold, comprising;

preparing a coating solution containing a coating material and at least one solvent, wherein the at least one solvent evaporates under reduced pressure, and filling a cavity of the mold with the coating solution; then closing the mold, and then depressurizing the cavity such that the coating material is distributed on the walls of the cavity by means of evaporation of the solvent.

15. The method according to claim 14, wherein said depressurizing the cavity is continued until the coating solution dries.

16. A process for manufacturing a urethane resin molded product formed by foam molding using water, comprising:

preparing a coating solution containing a coating material and at least one solvent, wherein the at least one solvent evaporates under reduced pressure, and filling a cavity of a mold with the coating solution; then closing the mold; then boiling the coating solution in the cavity in the mold while the mold is closed, during which time the solvent evaporates in the cavity and a coating film is formed on the wall surface of the cavity from the coating solution by distribution of the coating material on the walls of the cavity by means of evaporation of the solvent; and then supplying a urethane material into the cavity at atmospheric pressure.

17. A process for manufacturing a foamed urethane molded product having a surface skin layer, comprising:

preparing a coating solution containing a coating material and at least one solvent, wherein the at least one solvent evaporates under reduced pressure, and filling a cavity of a mold with the coating solution;

closing the mold; then depressurizing the cavity of the mold; then boiling the coating solution in the cavity to cause the solvent in the cavity to evaporate, whereby a coating layer is formed on the wall surface of the cavity during said boiling by means of the coating material being distributed on the walls of the cavity by means of said solvent evaporating; and then supplying a urethane material into the cavity under reduced pressure.

18. A process for manufacturing a resin molded product, wherein molding and coating are performed simultaneously, the process comprising:

preparing a coating solution containing a coating material and at least one solvent, wherein the at least one solvent evaporates under reduced pressure, and applying the coating solution to the wall surface of a cavity in a mold; then closing the mold; then boiling the coating solution in the cavity under reduced pressure to evaporate the solvent and to form a coating layer on the wall surface of the cavity while the mold is closed such that the coating material is distributed on the walls of the cavity by means of evaporation of the solvent; then heating a resin material to reduce flow resistance; then supplying the heated resin material into the cavity; and then curing the resin material in the cavity.

19. A process for manufacturing a urethane molded product, comprising:

preparing a coating solution containing a coating material and at least one solvent, wherein the at least one solvent evaporates under reduced pressure, and filling a cavity of a mold with the coating solution; then closing the mold; then forming a coating layer on the surface of the cavity of the closed mold by evaporating the solvent from the coating solution in the cavity while the mold is closed, such that the coating material is distributed on the walls of the cavity by means of evaporation of the solvent; then first injecting a first urethane material containing a pigment into the cavity at atmospheric pressure; and then second injecting a second urethane material that includes a larger amount of a pigment than the first urethane material.

20. The process according to claim 19, wherein forming a coating layer is carried out under reduced pressure.

21. The process according to claim 19, wherein said first urethane material is injected under reduced pressure.

22. The process according to claim 19, further comprising:

third injecting a third urethane material containing a smaller amount of a pigment than the first urethane material after the injection of the first urethane material and before the injection of the second urethane material.

23. A process for manufacturing a urethane molded product, comprising:

closing a mold; then supplying a coating solution containing a coating material and at least one solvent in a cavity of the closed mold at atmospheric pressure; and then depressurizing the cavity to form a coating layer on the entire surface of the cavity by evaporating the solvent from the coating solution such that the solvent distributes the coating material over the entire surface of the cavity as it evaporates.

24. A process for manufacturing a urethane molded product comprising:

closing a mold; then depressurizing a cavity of the mold; and then supplying a coating solution containing a coating material and at least one solvent in the cavity, whereby the solvent evaporates and a coating layer is formed on the entire surface of the cavity by means of said solvent distributing said coating material over the surface of the cavity as said solvent evaporates.

25. A method of forming a coating on the wall surface of a cavity in a mold, comprising:

closing he mold; then depressurizing the cavity of the mold; and then supplying a coating solution containing a coating material and at least one solvent into the cavity, whereby the solvent evaporates and a coating layer is formed on the entire surface of the cavity by means of said solvent distributing said coating material over the surface of the cavity as said solvent evaporates.

* * * * *